United States Patent
Qi et al.

(10) Patent No.: US 12,529,910 B2
(45) Date of Patent: Jan. 20, 2026

(54) SPECTACLE LENS, DESIGN METHOD FOR THE SAME, AND DESIGN SYSTEM FOR THE SAME

(71) Applicants: HOYA LENS THAILAND LTD., Pathumthani (TH); THE HONG KONG POLYTECHNIC UNIVERSITY, Hong Kong (CN)

(72) Inventors: Hua Qi, Tokyo (JP); Chi Ho To, Hong Kong (CN); Siu Yin Lam, Hong Kong (CN)

(73) Assignees: HOYA LENS THAILAND LTD., Pathumthani (TH); THE HONG KONG POLYTECHNIC UNIVERSITY, Hong Kong (CN)

( * ) Notice: Subject to any disclaimer, the term of this patent is extended or adjusted under 35 U.S.C. 154(b) by 376 days.

(21) Appl. No.: 18/014,092

(22) PCT Filed: Jul. 14, 2021

(86) PCT No.: PCT/JP2021/027246
§ 371 (c)(1),
(2) Date: Dec. 30, 2022

(87) PCT Pub. No.: WO2022/044630
PCT Pub. Date: Mar. 3, 2022

(65) Prior Publication Data
US 2023/0273458 A1  Aug. 31, 2023

(30) Foreign Application Priority Data

Aug. 26, 2020 (JP) ................................ 2020-142889

(51) Int. Cl.
*G02C 7/02* (2006.01)

(52) U.S. Cl.
CPC ............ *G02C 7/022* (2013.01); *G02C 7/027* (2013.01); *G02C 2202/24* (2013.01)

(58) Field of Classification Search
CPC .... G02C 7/022; G02C 7/027; G02C 2202/24; G02C 7/06
See application file for complete search history.

(56) References Cited

FOREIGN PATENT DOCUMENTS

| AU | 2015249098 A1 | 11/2015 |
|----|---------------|---------|
| CN | 110687689 A | 1/2020 |

(Continued)

OTHER PUBLICATIONS

PCT/JP2021/027246, "International Search Report", Nov. 28, 2021, 6 pages.

*Primary Examiner* — Tuyen Tra
(74) *Attorney, Agent, or Firm* — Oliff PLC

(57) ABSTRACT

A technology for inhibition of myopia progression adapted to the RPR of the wearer is provided. A spectacle lens and related technology are provided that include a base area that causes a beam that enters through an object-side surface to exit through an eye-side surface and converge on a retina via the eye, and a plurality of defocus areas that each contact the base area and have a characteristic whereby a beam that passes through at least a portion of the defocus area is incident on the retina as a diverging ray, and, in not less than half of the plurality of defocus areas, at least one of a defocus power and a size of each defocus area is set, so as to compensate for a change in retinal spot size due to relative peripheral refraction (RPR) that depends on an eccentricity angle of the eye of the wearer.

16 Claims, 16 Drawing Sheets

(56) References Cited

FOREIGN PATENT DOCUMENTS

| EP | 3561578 A1 | 10/2019 |
|---|---|---|
| JP | 2017510851 A | 4/2017 |
| WO | 2015147758 A1 | 10/2015 |
| WO | 2019166657 A1 | 9/2019 |
| WO | 2020078964 A1 | 4/2020 |

[Fig. 1]
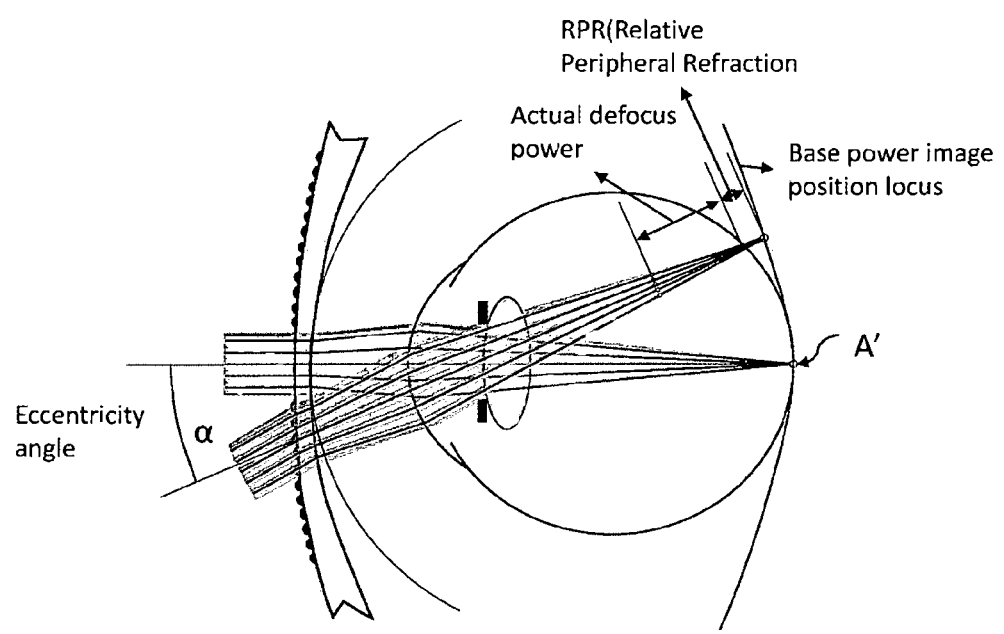

[Fig. 2]
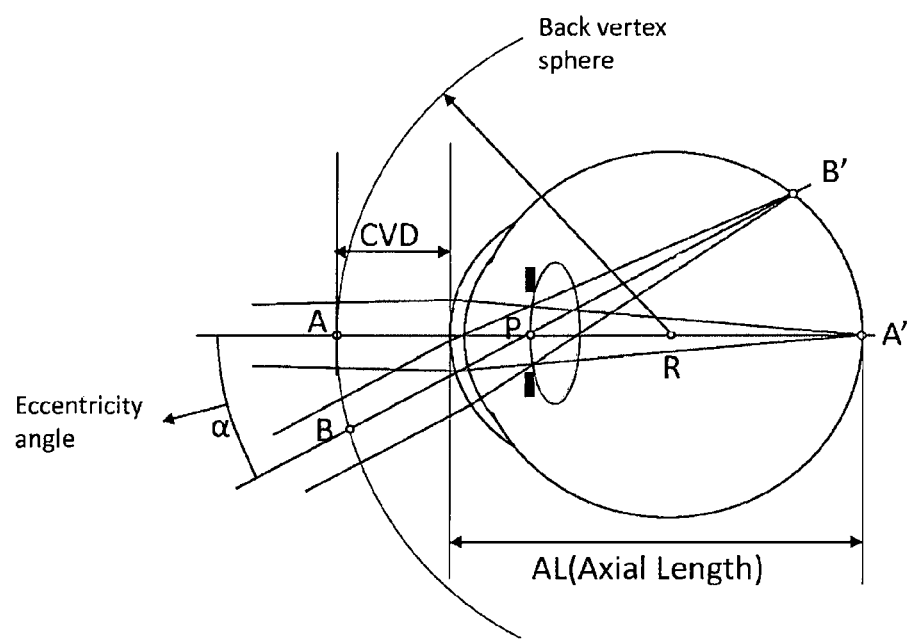

[Fig. 3]
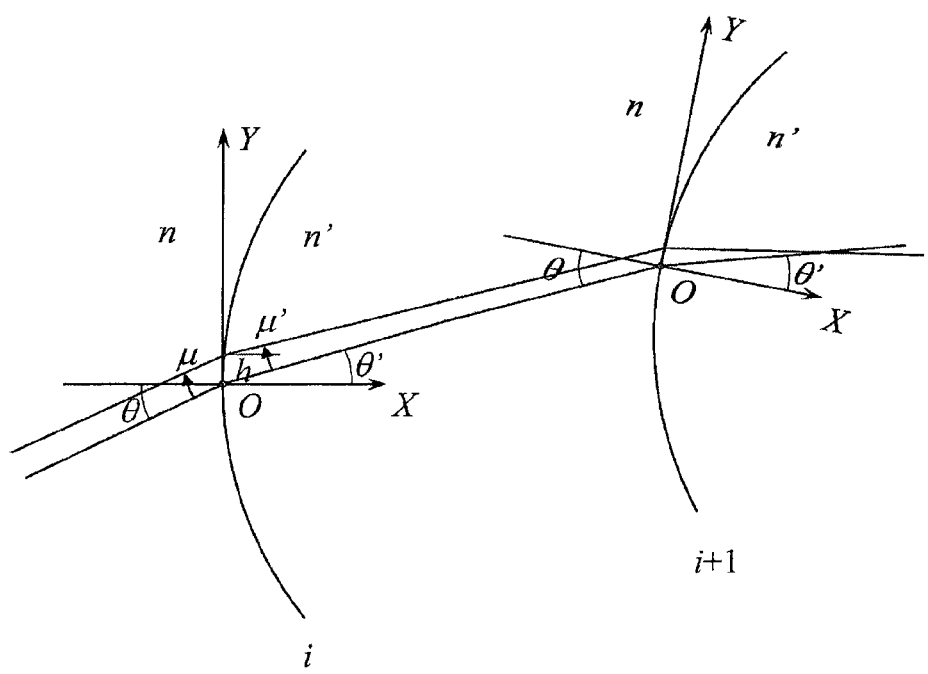

[Fig. 4]
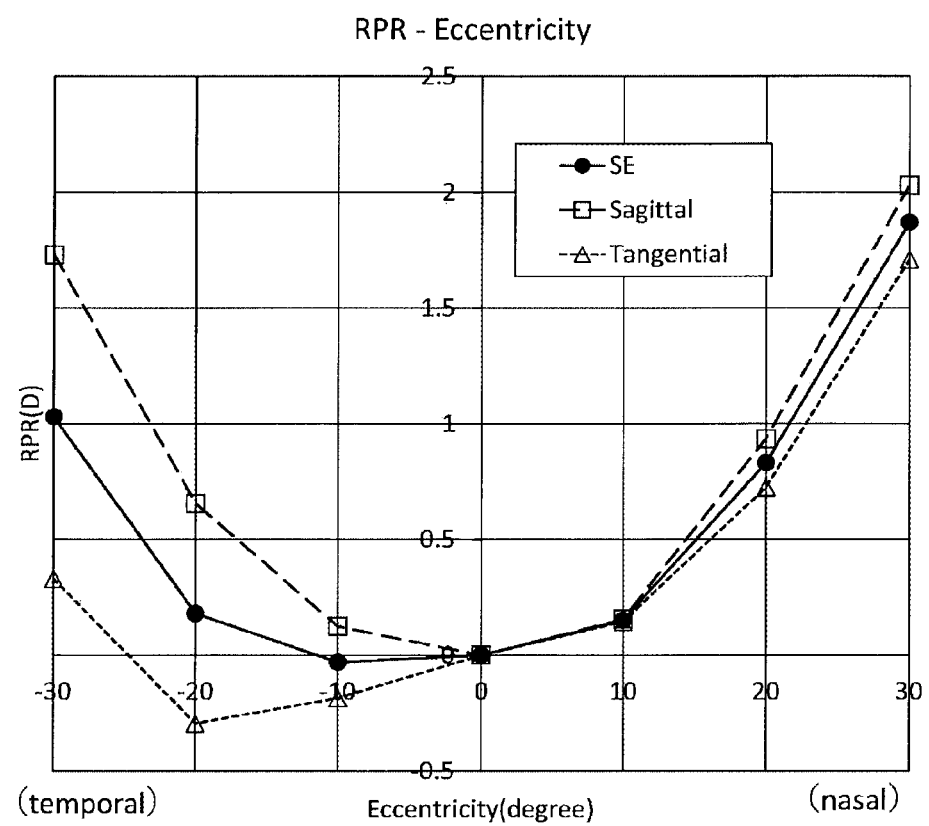

[Fig. 5]
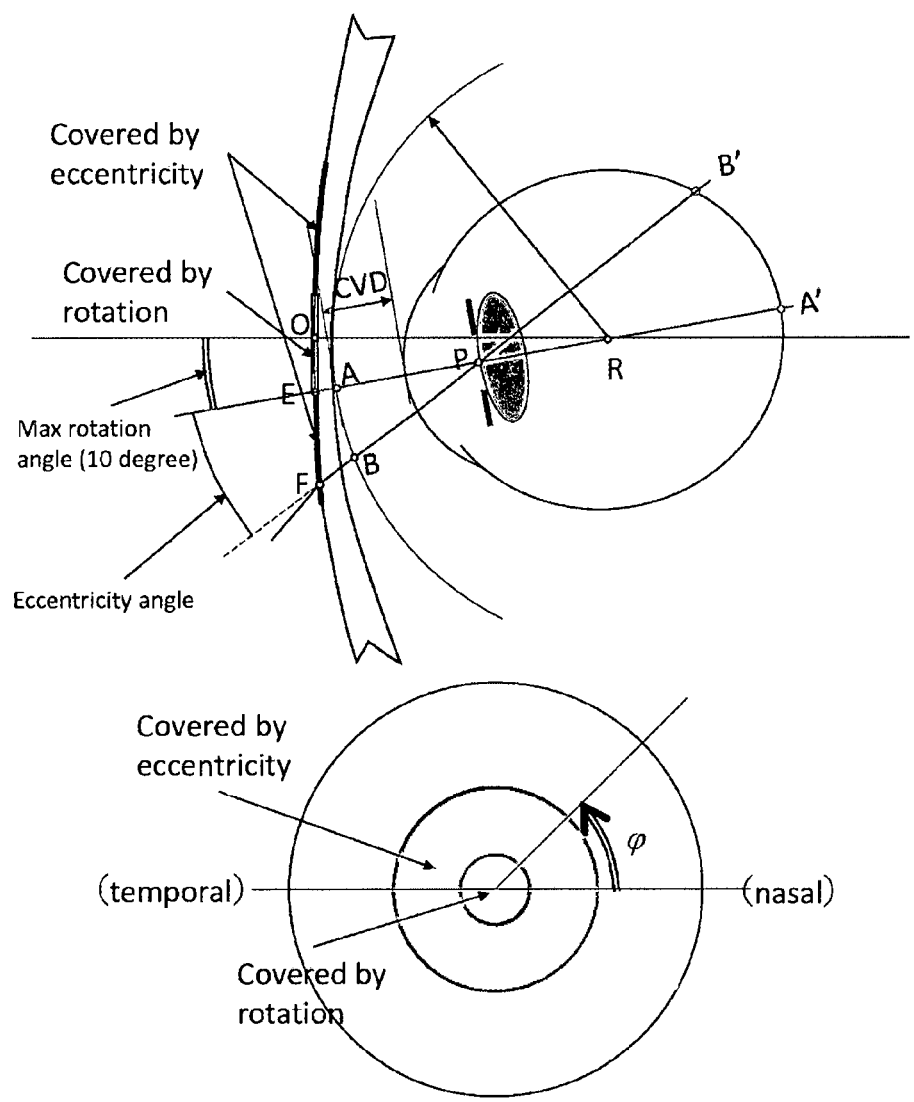

[Fig. 6]
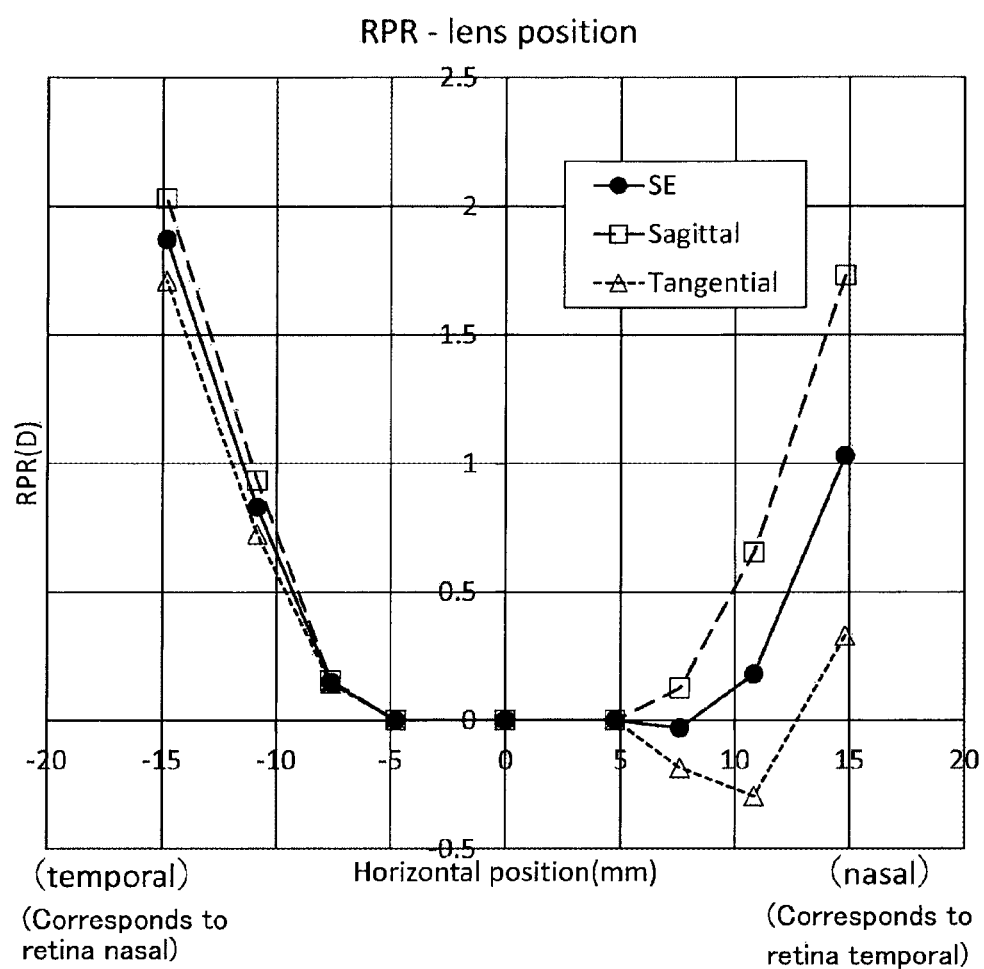

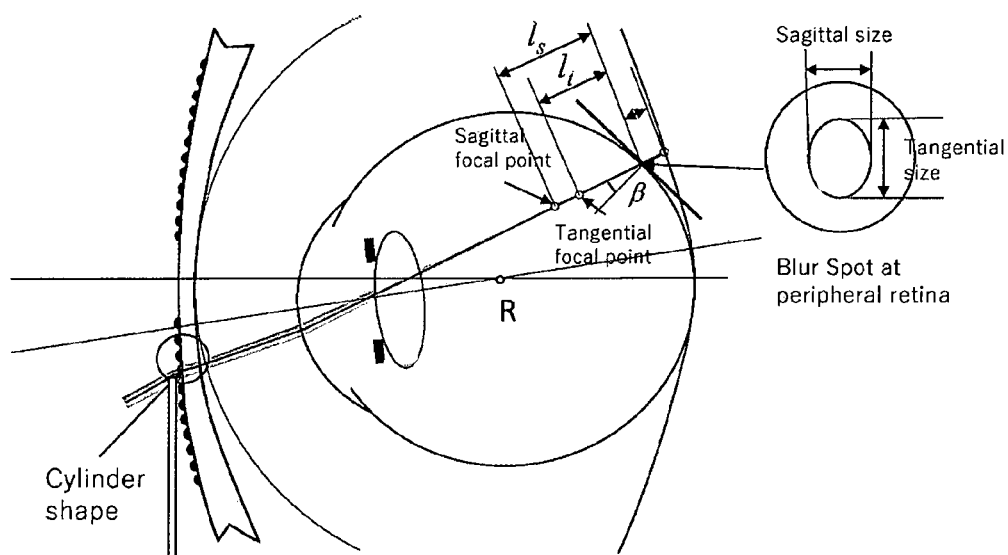
[Fig. 7A]    [Fig. 7B]
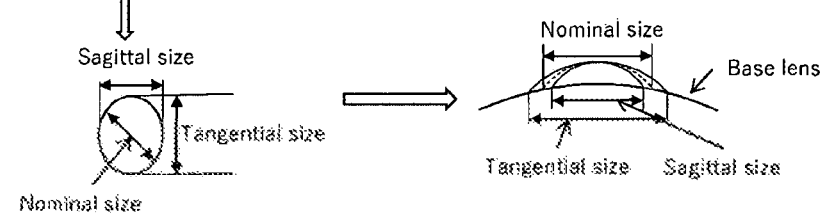
[Fig. 7C]    [Fig. 7D]

[Fig. 8]
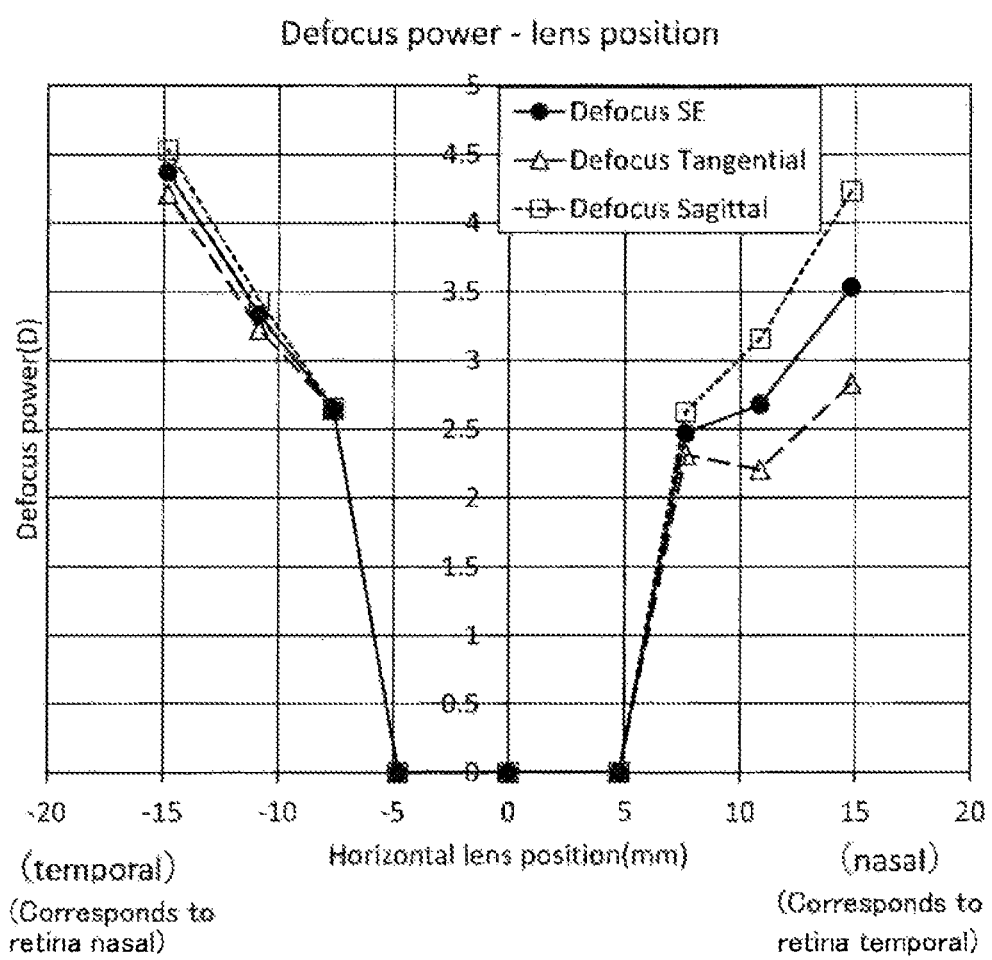

[Fig. 9]
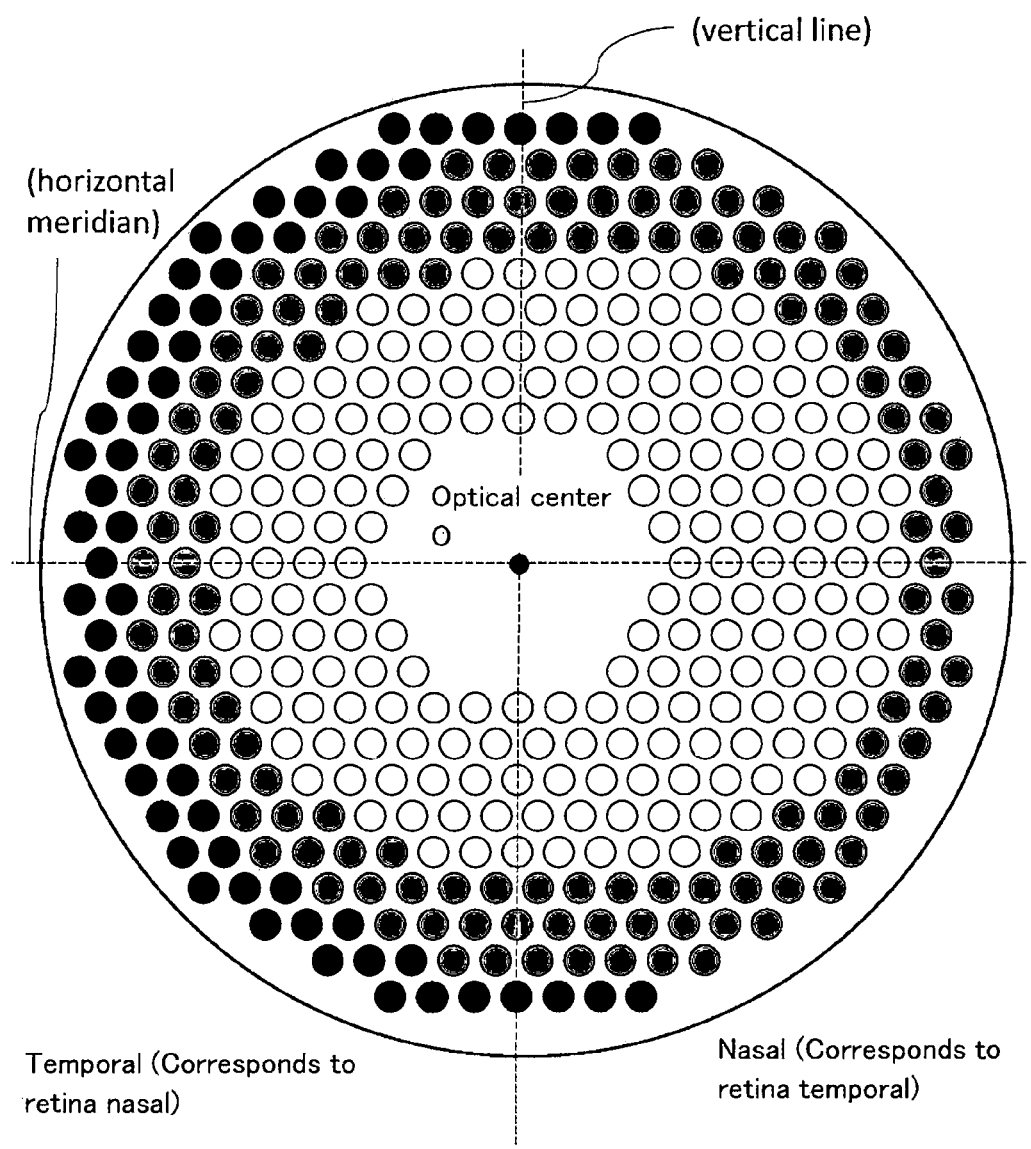

[Fig. 10]
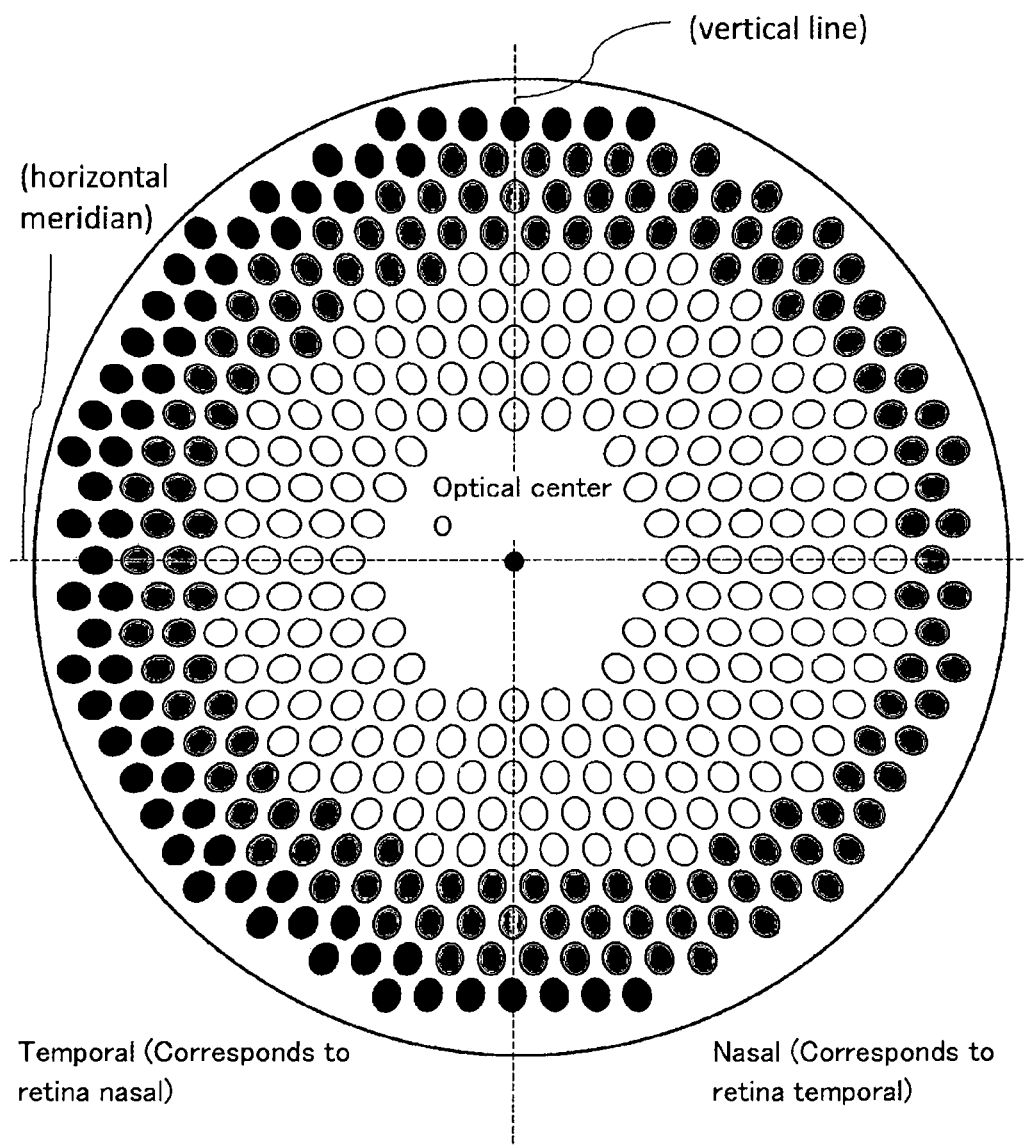

[Fig. 11]
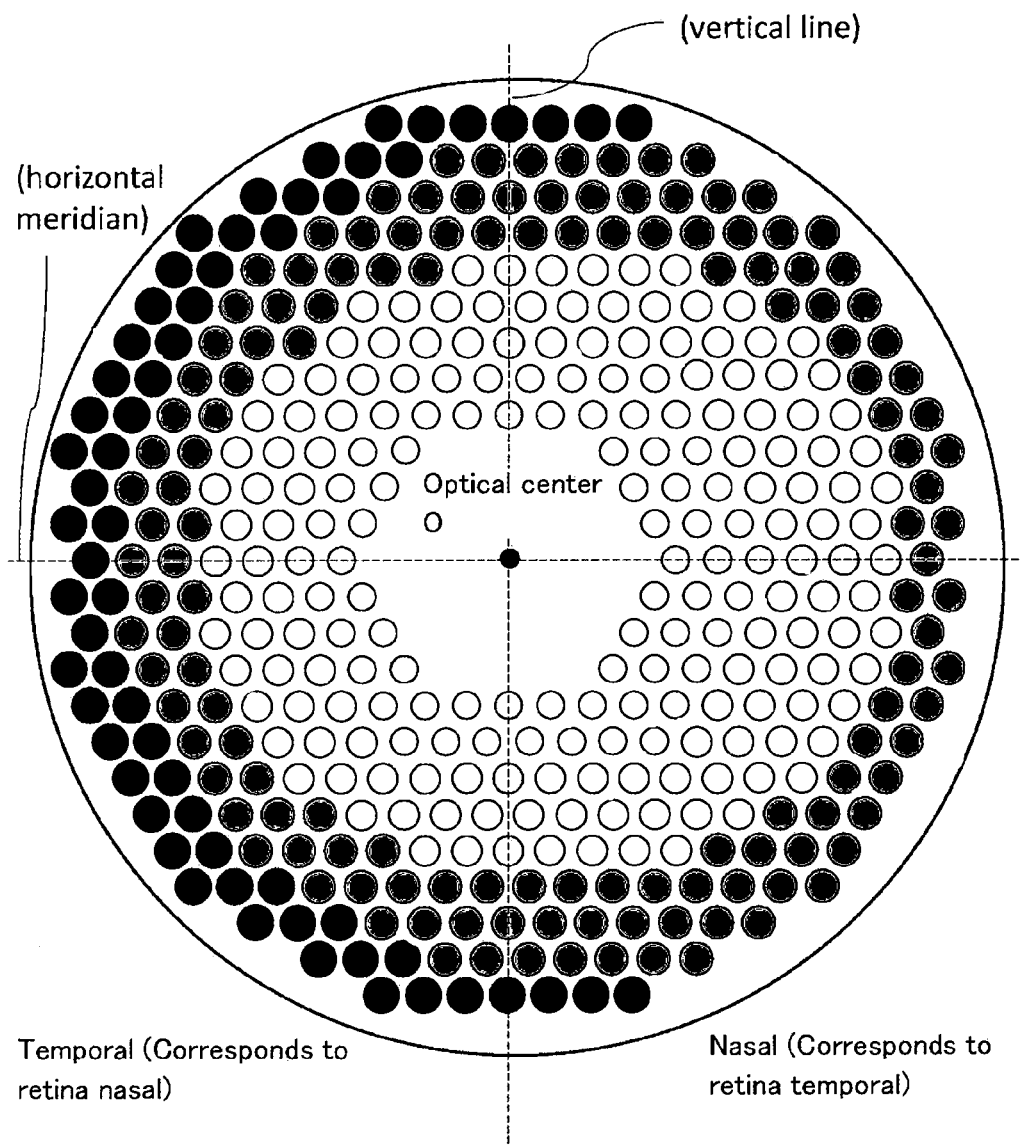

[Fig. 12]
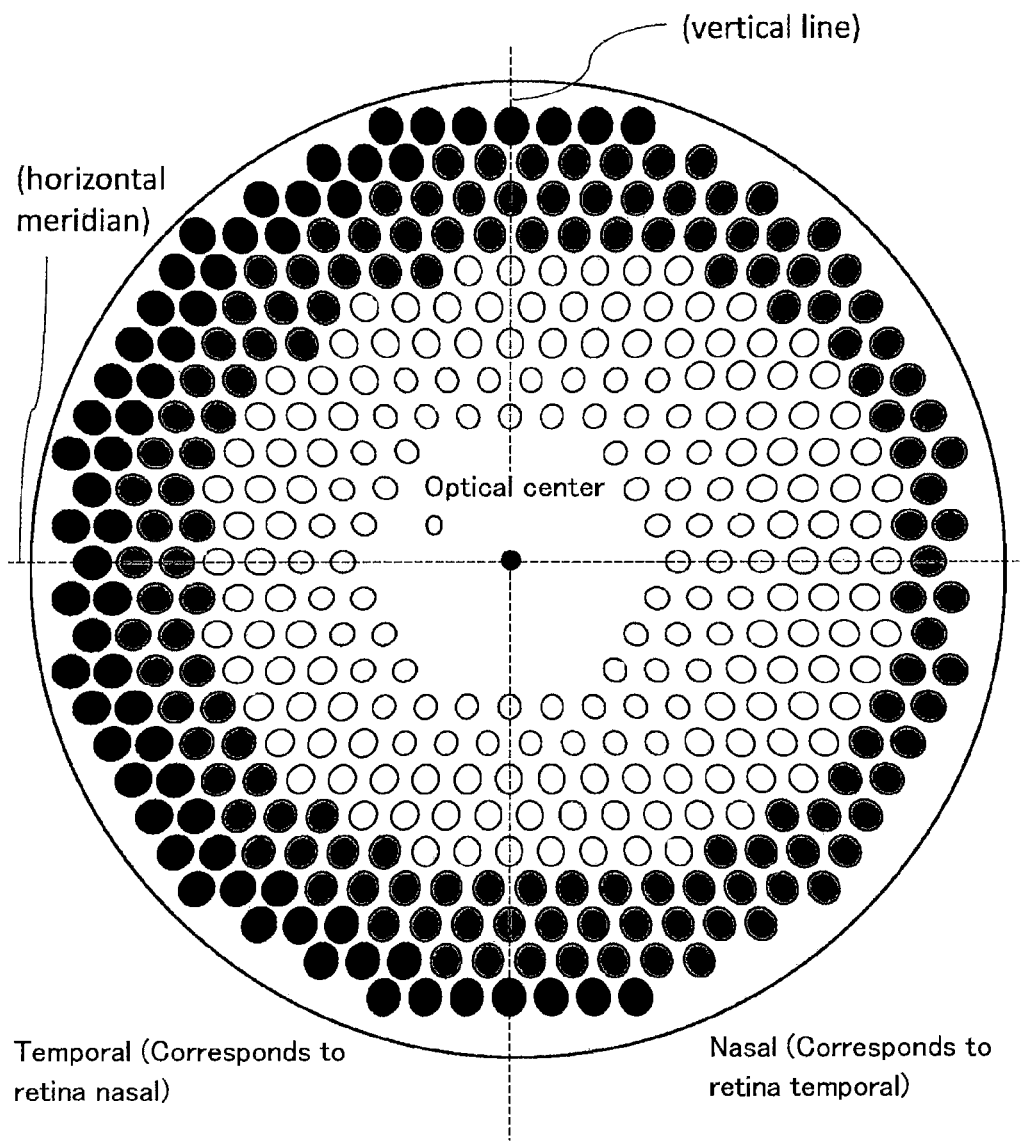

(lens temporal) 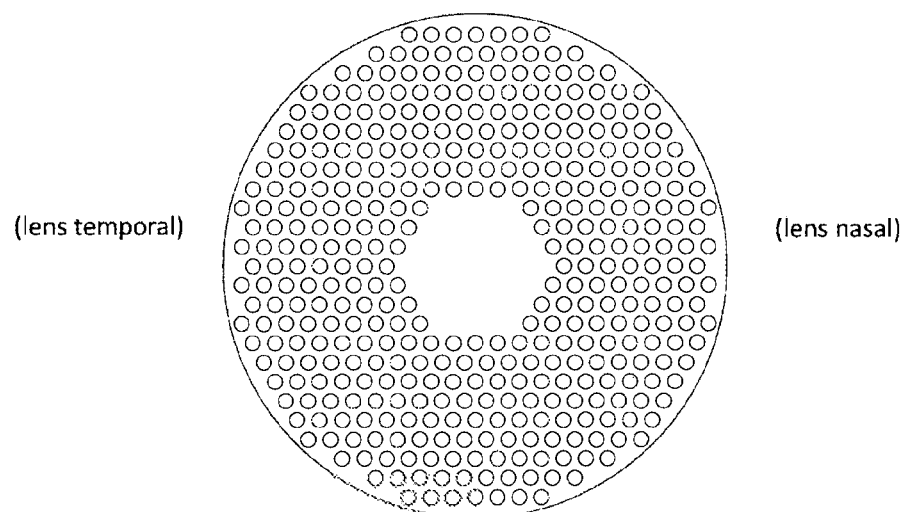 (lens nasal)
[Fig. 13A]   Defocus area distribution on lens
(retina nasal) 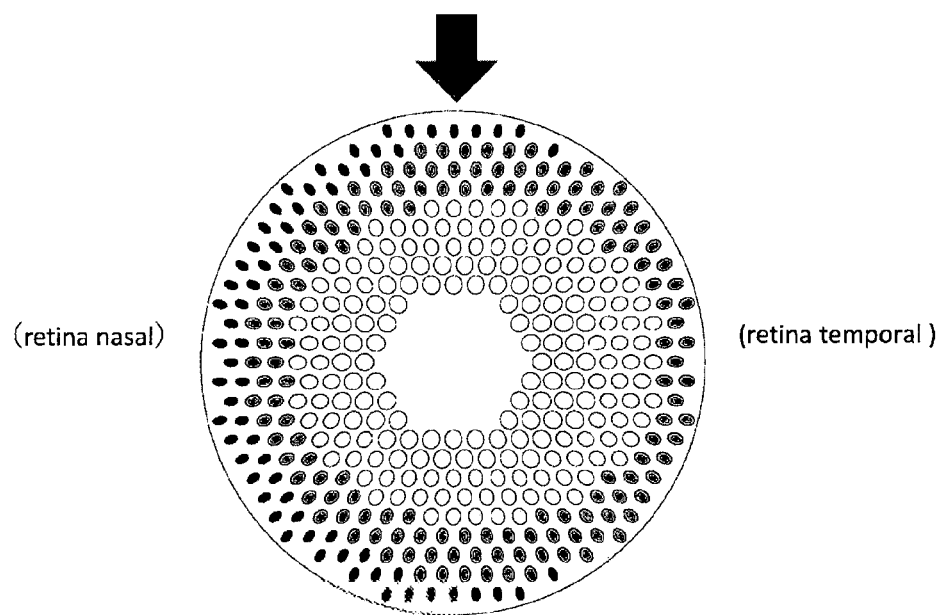 (retina temporal)
[Fig. 13B]   Shape and size distribution of spots on retina

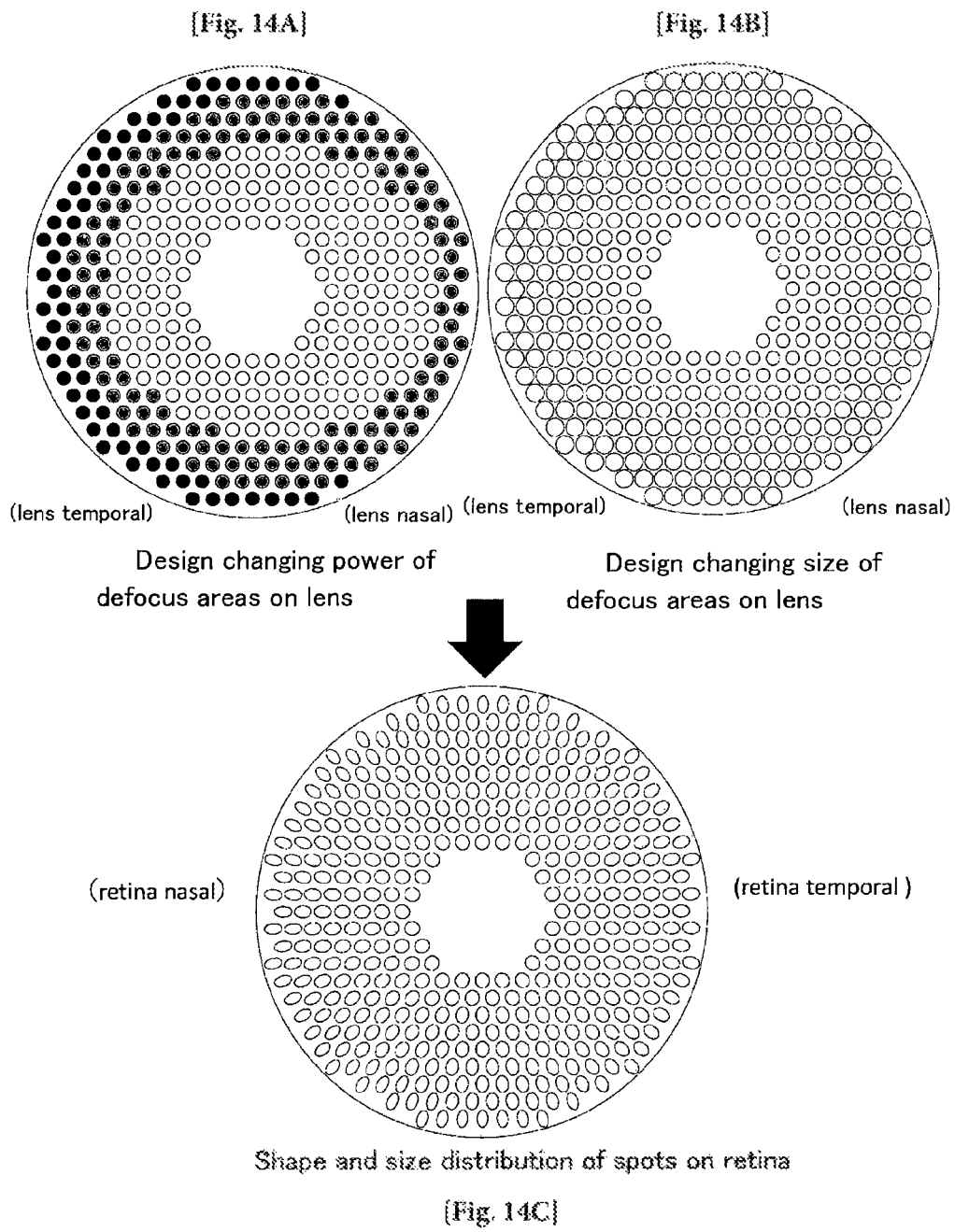

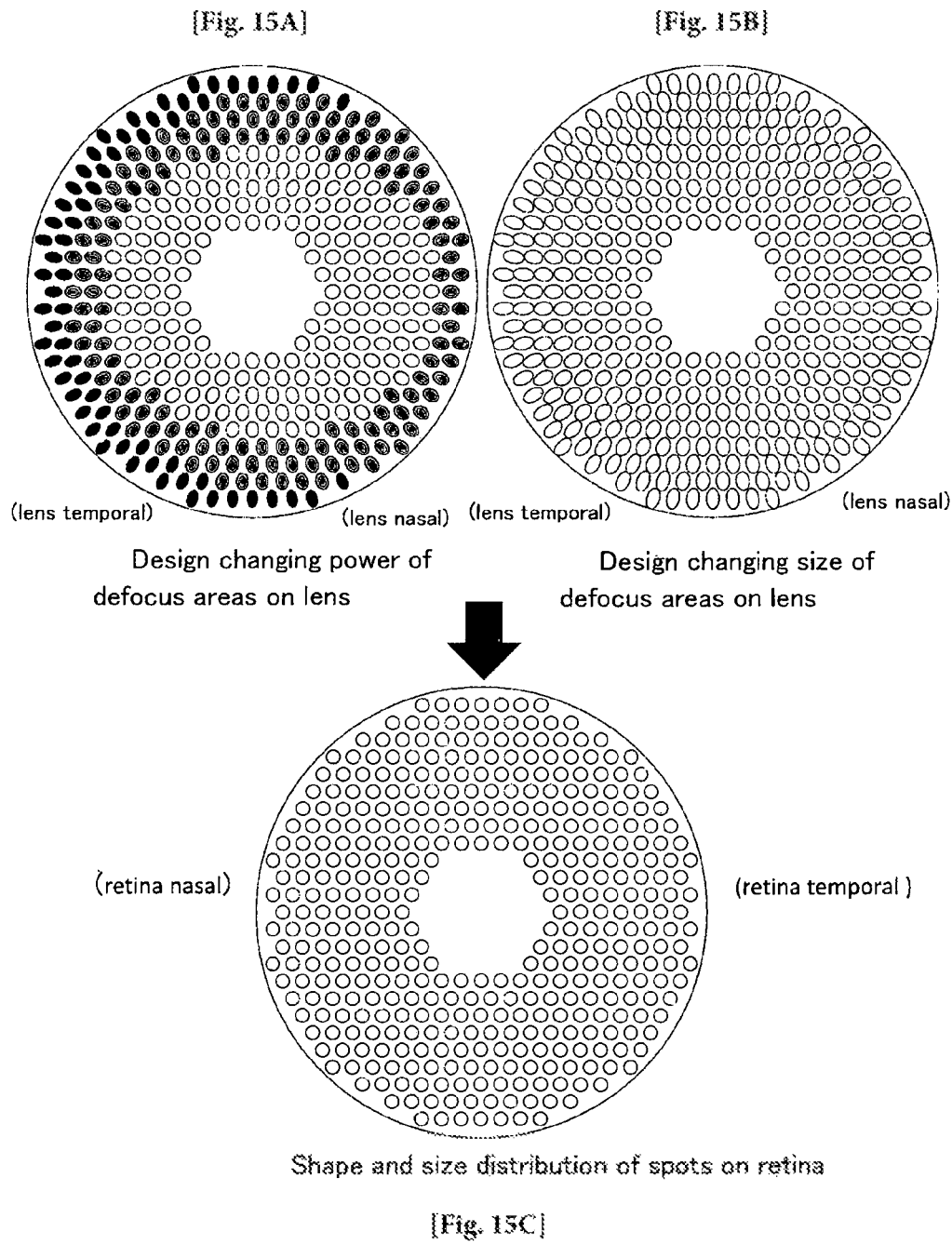

[Fig. 16]
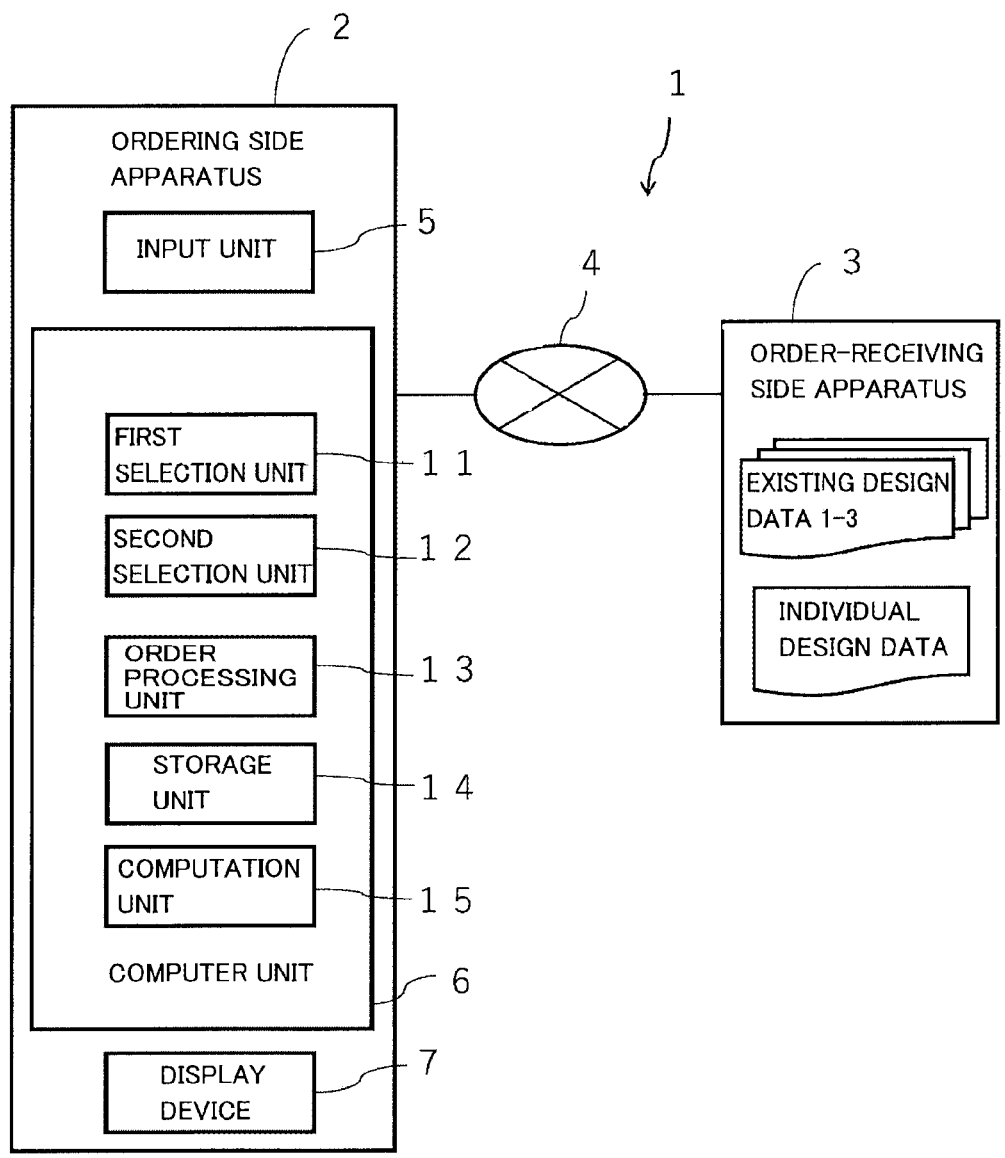

SPECTACLE LENS, DESIGN METHOD FOR THE SAME, AND DESIGN SYSTEM FOR THE SAME

CROSS-REFERENCE TO RELATED APPLICATIONS

This application is the National Stage of International Application No. PCT/JP2021/027246, filed on Jul. 14, 2021, which claims priority to Japanese Patent Application No. 2020-142889, filed Aug. 26, 2020, and the contents of which are incorporated herein by reference.

TECHNICAL FIELD

The present disclosure relates to a spectacle lens, a design method for the same, and a design system for the same.

BACKGROUND ART

There are spectacle lenses that inhibit the progression of refraction abnormalities such as myopia in which a plurality of island-like areas whose refractive power is more positive than the prescription refractive power are formed on the lens (e.g., refer to Patent Document 1). A spectacle lens of a mode described in Patent Document 1 is also referred to as a DIMS (Defocus Incorporated Multiple Segments) spectacle lens, and abbreviated as DIMS. Hereinafter, these island-like areas will be referred to as defocus areas.

A beam that enters through the object-side surface and exits through the eye-side surface is, in principle, focused on the retina of the wearer, although, according to a spectacle lens having the above configuration, a beam that passes through a portion of the defocus area will be focused at a position in front of the retina, thereby inhibiting myopia progression.

In this specification, the forward direction in which the object to be viewed exists in the optical axis direction will be referred to as the front side, and the depth direction, which is the opposite direction to the front side, rearward in the optical axis direction, that is, toward the eye from the spectacle lens, will be referred to as the back side.

CITATION LIST

Patent Literature

Patent Document 1: US 2017/0131567 A1

SUMMARY OF THE DISCLOSURE

Technical Problem

FIG. 1 shows how rays entering the eye through peripheral vision focuses behind the peripheral retina when the DIMS illustrated in FIG. 1 of Patent Document 1 is worn.

As shown in FIG. 1, rays entering the eye through peripheral vision in accordance with an eccentricity angle from the optical axis direction passes through the spectacle lens at an angle. Therefore, off-axis hyperopia occurs together with off-axis astigmatism (oblique astigmatism).

As a result, as shown in FIG. 1, a gap occurs between the base power image position locus and the peripheral retina. Due to this gap, actual defocus power may decrease compared with the defocus power to which the DIMS is set.

This gap generally increases as the distance from the fovea of the retina increases. Refractive power caused by this gap is also referred to as relative peripheral refraction (RPR). A detailed definition will be given later.

The inventor felt that the shape and size of spots that are formed on the retina due to the beam of parallel rays entering the defocus areas (in other words, spreading of the beam causing spots) when wearing the DIMS was a key factor in the effect of inhibiting myopia progression.

An aspect according to one embodiment of the present disclosure is to provide a technology for inhibition of myopia progression adapted to the RPR of the wearer.

An aspect according to another embodiment of the present disclosure is to evaluate existing designs using the RPR of the wearer, and select a lens that maximizes the myopia progression inhibitory effect.

Solution to Problem

A first aspect of the present disclosure is a spectacle lens including:
a base area that causes a beam that enters through an object-side surface to exit through an eye-side surface and converge on a retina via the eye; and
a plurality of defocus areas that each contact the base area and have a characteristic whereby a beam that passes through at least a portion of the defocus area is incident on the retina as a diverging ray,
in not less than half of the plurality of defocus areas, at least one of a defocus power and a size of each defocus area being set, so as to compensate for a change in retinal spot size due to relative peripheral refraction (RPR) that depends on an eccentricity angle of the eye of a wearer.

A second aspect of the present disclosure is an aspect according to the first aspect, in which, in not less than 80% of the plurality of defocus areas, the size of each defocus area is equal, and the defocus power of each defocus area is set so as to compensate for the change in retinal spot size due to the RPR.

A third aspect of the present disclosure is an aspect according to the first aspect, in which, in not less than 80% of the plurality of defocus areas, the defocus power of each defocus area is equal, and the size of each defocus area is set so as to compensate for the change in retinal spot size due to the RPR.

A fourth aspect of the present disclosure is an aspect according to any one of the first to third aspects, in which not less than 80% of the plurality of defocus areas have a cylinder shape that cancels an astigmatism component caused by the RPR that depends on the eccentricity angle corresponding to a position of each defocus area.

A fifth aspect of the present disclosure is an aspect according to the fourth aspect, in which, in each cylinder-shaped defocus area, an amount of residual astigmatism after canceling the astigmatic component of the RPR is not more than one third of an actual defocus power of the defocus area after subtracting a spherical equivalent of the RPR that depends on the eccentricity angle corresponding to the position of the defocus area from the defocus power of the defocus area.

A sixth aspect of the present disclosure is an aspect according to any one of the first to fifth aspects, in which, in not less than 80% of the plurality of defocus areas, the actual defocus power of each defocus area after subtracting the spherical equivalent of the RPR that depends on the eccentricity angle corresponding to the position of the defocus area from the defocus power of the defocus area is in a range of 1.0-4.5 D.

A seventh aspect of the present disclosure is an aspect according to any one of the first to sixth aspects, in which, the spectacle lens is a myopia progression inhibition lens.

An eighth aspect of the present disclosure is a design method for a spectacle lens that includes a base area that causes a beam that enters through an object-side surface to exit through an eye-side surface and converge on a retina via the eye and a plurality of defocus areas that each contact the base area and have a characteristic whereby a beam that passes through at least a portion of the defocus area is incident on the retina as a diverging ray, the method including:

a setting step of setting, in not less than half of the plurality of defocus areas, at least one of a defocus power and a size of each defocus area, so as to compensate for a change in retinal spot size due to relative peripheral refraction (RPR) that depends on an eccentricity angle of the eye of a wearer.

A ninth aspect of the present disclosure is an aspect according to the eighth aspect, in which the spot size is obtained based on retina shape data constructed using data on a plurality of the RPR that depend on mutually different eccentricity angles and data on an axial length of the wearer.

A tenth aspect of the present disclosure is an aspect according to the eighth or ninth aspect, including a position conversion step of calculating a position on the lens corresponding to an eccentricity angle or calculating an eccentricity angle corresponding to a position on the lens; and the setting step of setting at least one of the defocus power and the size of each defocus area, so as to compensate for the change in retinal spot size due to the RPR at the eccentricity angle corresponding to the position, in the position conversion step, where an area whose center is a lens optical center and whose radius is one value within a range of 2-6 mm is set as a range covered by rotation, and the eccentricity angle corresponding to a position within the range is set to zero, the eccentricity angle corresponding to a predetermined position on the lens outside the range covered by rotation being an angle formed by the optical axis of the eye and a straight line connecting the predetermined position and an entrance pupil of the eye, after having performed eye rotation such that a line of sight passes through a point on a boundary of the range covered by rotation that is on a straight line formed by the predetermined position and the lens optical center.

An eleventh aspect of the present disclosure is a design system for a spectacle lens that includes a base area that causes a beam that enters through an object-side surface to exit through an eye-side surface and converge on a retina via the eye and a plurality of defocus areas that each contact the base area and have a characteristic whereby a beam that passes through at least a portion of the defocus area is incident on the retina as a diverging ray, the system including:

a first selection unit that selects an individual design mode of setting, in not less than half of the plurality of defocus areas, at least one of a defocus power and a size of each defocus area, so as to compensate for a change in retinal spot size due to relative peripheral refraction (RPR) that depends on an eccentricity angle of the eye of a wearer, or selects an existing design mode of employing one from a plurality of pre-prepared design data that includes the base area and the plurality of defocus areas and whose patterns of the defocus areas are mutually different.

A twelfth aspect of the present disclosure is an aspect according to the eleventh aspect, in which, in the existing design mode, design data with which the change in retinal spot size due to the RPR of the wearer in each defocus area is smallest is employed, from the plurality of design data.

A thirteenth aspect of the present disclosure is an aspect according to the eleventh or twelfth aspect, in which the spot size is obtained based on retina shape data constructed using data on a plurality of the RPR that depend on mutually different eccentricity angles and data on an axial length of the wearer.

Other aspects of the present disclosure which can be combined with the above aspects are as follows.

Approximately circular defocus areas may be disposed in an island-like manner (i.e., in a separated state not adjacent to each other) equidistantly in the sagittal direction and the tangential direction around a lens center part. As an example of the disposition of the defocus areas in plan view, the defocus areas may be discretely disposed independently such that the center of each convex area will be at the vertex of an equilateral triangle (disposed with the center of each defocus area at the vertex of a honeycomb structure). In this case, the interval between defocus areas may be 1.0-2.0 mm. Also, the number of defocus areas may be 100-100000.

Each of the defocus areas may be constituted as follows, for example. The diameter of the defocus area is favorably about 0.6-2.0 mm. The protruding height (protruding amount) of the defocus area is about 0.1-10 μm, and favorably about 0.4-2.0 μm.

Note that although there is no limitation on the specific numerical value of the defocus power prior to subtracting the spherical equivalent of RPR, the defocus power produced by the defocus areas on the DIMS preferably has a minimum value within a range of 0.5-4.5 D and a maximum value within a range of 3.0-10.0 D, for example. The difference between the maximum value and the minimum value is preferably within a range of 1.0-5.0 D.

Not less than 80% of the plurality of defocus areas preferably have a cylinder shape that cancels the astigmatic component produced due to RPR which depends on the eccentricity angle corresponding to the position of each defocus area, and the major/minor axis ratio (tangential size/sagittal size) of the spot size of the wearer is preferably equalized (fluctuation range within ±10% (favorably within ±5%, more favorably within ±1%)).

Other aspects described below can be implemented as stand-alone inventions.

In the case where the RPR on the nasal side of the retina at the same eccentricity angle differs from the RPR of the temporal side, preferably the set pattern of at least one of defocus power and size with respect to each defocus area differs between the plurality of defocus areas disposed on the nasal side of the lens and the plurality of defocus areas disposed on the temporal side of the lens.

Preferably the size of the defocus area increases and/or the defocus power of the defocus area increases from the center part toward the peripheral portion of the spectacle lens.

Preferably the set pattern of defocus power with respect to each defocus area differs between the plurality of defocus areas disposed on the nasal side and the plurality of defocus areas disposed on the temporal side.

Preferably the plurality of defocus areas disposed on the nasal side have a set pattern whose defocus power is higher and/or whose size is larger than the plurality of defocus areas disposed on the temporal side. In the case of employing large-sized defocus areas, the interval is also desirably increased.

Advantageous Effects of Disclosure

According to one embodiment of the present disclosure, a technology for inhibition of myopia progression adapted to the RPR of the wearer can be provided.

According to another embodiment of the present disclosure, existing designs can be evaluated using the RPR of the wearer, and a lens that maximizes the myopia progression inhibitory effect can be selected.

BRIEF DESCRIPTION OF THE DRAWINGS

FIG. 1 is a diagram showing how rays entering the eye through peripheral vision focuses behind the peripheral retina when the DIMS illustrated in FIG. 1 of Patent Document 1 is worn.

FIG. 2 is a diagram showing an outline of how to measure RPR with an autorefractor keratometer (eye refraction/corneal curvature radius measurement apparatus).

FIG. 3 is a diagram illustrating a ray tracing method for deriving a retinal spot.

FIG. 4 is a graph showing the relation (i.e., case) between RPR on the horizontal meridian and the eccentricity angle for a subject.

FIG. 5 is a diagram showing an outline of using an eccentricity angle of the eye of the wearer to calculate a position on the lens corresponding to this eccentricity angle.

FIG. 6 is a graph showing the relation between RPR and a lens horizontal position corresponding to respective eccentricity angles for the subject related to FIG. 4.

FIGS. 7A-7D are diagrams showing an outline of the shape of spots in the case where the shape of the defocus areas is a cylinder shape in one aspect of the present disclosure.

FIG. 8 is a graph showing the relation between the power of the defocus area designed in correspondence with the case in FIG. 4 and the lens horizontal position.

FIG. 9 is a schematic plan view of a spectacle lens corresponding to the case in FIG. 4 in which the defocus areas are each discretely disposed independently such that the center of the defocus areas of a spherically shaped design form an equilateral triangle array distribution. This means that defocus power is greater the darker the color.

FIG. 10 is a schematic plan view of a spectacle lens corresponding to the case in FIG. 4 in which the defocus areas in FIG. 9 are changed to a cylinder shape design whose major axis is in the tangential direction and whose minor axis is in the sagittal direction. This means that defocus power is greater the darker the color.

FIG. 11 is a schematic plan view of a spectacle lens in which the defocus areas in FIG. 9 are modified so as to set the size of the defocus areas to correspond to the case in FIG. 4, while making the defocus power of the defocus areas equal. This means that the size of the defocus areas is larger the darker the color.

FIG. 12 is a schematic plan view of a spectacle lens corresponding to the case in FIG. 4 in which the defocus areas in FIG. 11 are changed to a cylinder shape design whose major axis is in the tangential direction and whose minor axis is in the sagittal direction. This means that the size of the defocus areas is larger the darker the color.

FIGS. 13A-13B are diagrams showing the distribution of retinal spot sizes (FIG. 13B) in the case where both the defocus power and size of each defocus area are equal (FIG. 13A). This means that the spots are smaller the darker the color.

FIGS. 14A-14C are diagrams showing the distribution of retinal spot sizes (FIG. 14C) in the case where the defocus power of each defocus area is set, while the size of each defocus area is equal (FIG. 14A; approx. same as FIG. 9), or in the case where the size of each defocus area is set, while the defocus power of each defocus area is equal (FIG. 14B; approx. same as FIG. 11). This means that defocus power is greater the darker the color.

FIGS. 15A-15C is a diagram showing the distribution of retinal spot sizes (FIG. 15C) in the case where the defocus areas in FIG. 9 are changed to a cylinder shape design in plan view whose major axis is in the tangential direction and whose minor axis is in the sagittal direction (FIG. 15A; approx. same as FIG. 10), or in the case where the defocus areas in FIG. 11 are changed to a cylinder shape design in plan view whose major axis is in the tangential direction and whose minor axis is in the sagittal direction (FIG. 15B; approx. same as FIG. 12). This means that defocus power is greater the darker the color.

FIG. 16 is a schematic view showing an example of a configuration of a spectacle lens supply system according to the one aspect of the present disclosure.

EMBODIMENTS OF THE DISCLOSURE

Hereinafter, embodiments of the present disclosure will be described. The following description based on the drawings is illustrative, and the present disclosure is not limited to the illustrated modes. With regard to contents not described in this specification, the entire contents of Patent Document 1 are incorporated herein, if contents not described in Patent Document 1 (particularly contents relating to the manufacturing method), the entire contents of International Patent Application Publication No. WO 2020/004551 A1 are incorporated herein. In the event of any contradiction between the contents of Patent Document 1 and the above Application Publication, the contents of the Application Publication shall take precedence.

The spectacle lens (DIMS) given in this specification has an object-side surface and an eye-side surface. The "object-side surface" is the surface that is located on the object side when the spectacles provided with the spectacle lens is worn by the wearer, and the "eye-side surface" is the surface located on the opposite side, that is, the eye side when the spectacles provided with the spectacle lens are worn by the wearer. This relation also applies to the lens material forming the basis of the spectacle lens. That is, the lens material also has an object-side surface and an eye-side surface.

In this specification, "-" indicates a range from greater than or equal to a predetermined value to less than or equal to a predetermined value.

Spectacle Lens

The following is a spectacle lens (DIMS) according to one aspect of the present disclosure.

"A spectacle lens including:
  a base area that causes a beam that enters through an object-side surface to exit through an eye-side surface and converge on a retina via the eye; and
  a plurality of defocus areas that each contact the base area and have a characteristic whereby a beam that passes through at least a portion of the defocus area is incident on the retina as a diverging ray,
  in not less than half of the plurality of defocus areas, at least one of a defocus power and a size of each defocus area being set, so as to compensate for a change in retinal spot size due to relative peripheral refraction (RPR) that depends on an eccentricity angle of the eye of a wearer."

The base area is a portion having a shape capable of realizing the prescription refractive power of the wearer, and corresponds to the first refraction area in Patent Document 1.

The defocus area is an area in which at least a portion thereof does not focus rays at a focal position of the base area. The defocus area is a portion corresponding to the micro-convex part in Patent Document 1. The spectacle lens according to the one aspect of the present disclosure is a myopia progression inhibition lens similar to the spectacle lens described in Patent Document 1. Similarly to the micro-convex parts in Patent Document 1, the plurality of defocus areas according to the one aspect of the present disclosure need only be formed on at least one of the object-side surface and the eye-side surface of the spectacle lens. In this specification, the case where the plurality of defocus areas are provided only on the object-side surface of the spectacle lens will be mainly illustrated.

A configuration may be adopted in which defocus areas are formed in the lens center part, as illustrated in FIG. 10 in Patent Document 1, or in which defocus areas are not formed in the lens center part, as illustrated in FIG. 1 in Patent Document 1. In the one aspect of the present disclosure, the case where defocus areas are not formed in the lens center part is illustrated.

"The lens center part" refers to the geometric center, the optical center or the coring center of the spectacle lens and the vicinity thereof. In this specification, the case of a coring center and the vicinity thereof will be illustrated. This coring center is also referred to as the lens center. In this specification, the case where rays pass through the lens center when the wearer is gazing frontally will be illustrated.

FIG. 1 is a diagram showing how rays entering the eye through peripheral vision focus behind the peripheral retina when the DIMS illustrated in FIG. 1 in Patent Document 1 are worn.

FIG. 2 is a diagram showing an outline of how to measure the RPR with an autorefractor keratometer (eye refraction/cornea curvature radius measurement apparatus). CVD shows the distance to the corneal apex. R shows the rotation center of the eye. α shows the eccentricity angle. P shows the center of the entrance pupil of the eye. Point A indicates the point at which the rays that reach point A' (fovea) pass through the lens eye-side surface. Point B indicates the point at which the rays that reach point B' (peripheral retina) pass through the back vertex sphere (sphere having a center R and a radius AR) of the spectacle lens. An auto ref/kerato refractometer is a device that shines light on the retina from the pupil and measures the refractive power of the eye from the light that is reflected, and a commercial apparatus (e.g., Shin-Nippon NVision-K5001 (Ajinomoto Trading Inc.)) need to be employed.

"RPR" in this specification is defined as follows.

The subject, under cycloplegia, is made to rotate his or her eyes toward fixation targets present in directions other than frontally and maintain his or her gaze on the fixation targets. In this state, the refractive power when rays pass through the subject's eye is measured from directly in front of the subject. The difference between this refractive power and the refractive power of the frontal gaze of the subject (state of A' in FIG. 1) is the RPR. The angle between the direction of the fixation target on which the wearer's gaze is maintained at this time and the frontal direction will be referred to as the eccentricity angle. Note that since the "subject" of this specification can be a future "wearer" of the spectacle lens, subject may be used to have the same meaning as wearer.

The "eccentricity angle" in this specification is the angle formed by a straight line connecting lens point A through which the optical axis of the eye, that is, the line of sight of the wearer when gazing frontally, passes and point P which is the center of the entrance pupil of the eye and a straight line connecting a predetermined position outside the eye that is shifted from the optical axis (and consequently, lens point B through which the line of sight passes when the wearer is viewing an object at that predetermined position) and point P which is the center of the entrance pupil of the eye. That is, the eccentricity angle is <APB (a angle) in FIG. 2. As shown in FIG. 2, the eccentricity angle shows the degree of eccentricity from point A' (fovea) to point B' (peripheral retina). There is a favorable method of defining the eccentricity angle in order to simplify the task of converting the eccentricity angle to a position on the lens, with this definition method being described later.

The curvature of the wavefront that is formed at the position A in front of the cornea by the beam emitted from the A' point on the retina shown in FIG. 2 is the refraction value of the frontal gaze. The refraction value includes spherical power, astigmatic power, and the astigmatism axis angle. The refraction value of the eccentricity angle α is measured, under cycloplegia, from directly in front of the subject, in a state where the subject's gaze is maintained in the α direction. In terms of FIG. 2, the refraction value of the eccentricity angle α (i.e., refraction value at point B' (peripheral retina)) is the curvature of the wavefront that is formed at point B in front of the cornea by beams equally emitted from the one point B' on the peripheral retina. The RPR is defined as the difference between the curvature of the wavefront formed at B and the curvature of the wavefront formed at A.

The specific technique for measuring RPR is not limited. For instance, RPR may be measured using an apparatus such as Shin-Nippon NVision-K5001 (Ajinomoto Trading Inc.), as one example.

In the one aspect of the present disclosure, in not less than half of the plurality of defocus areas, at least one of the defocus power and size of each defocus area is set so to compensate for change in the retinal spot size due to RPR. The "size of the defocus area" in this specification refers to the size in plan view. "Size" in this specification refers to the area.

As shown in FIG. 1, in the case where the RPR on the peripheral retina is positive, the focal position of the base power of the lens will be inside the retina, the focal position of the defocus area will be relatively close to the retina, and the spot formed on the retina by diverging rays from the focal position of the defocus area decreases in size. In order to compensate for this, there is a method that involves moving the focal position of the defocus areas away from the retina, that is, increasing the defocus power, and a method that involves enlarging the defocus areas.

For example, in the case where a defocus power of 3.50 D [units: diopters] is initially set uniformly for the DIMS, this defocus power degrades due to the RPR of the wearer. In the majority of cases, degradation increases with increasing eccentricity angle.

In view of this, defocus areas at positions corresponding to a larger eccentricity angle are set to a larger defocus power than defocus areas at positions corresponding to a smaller eccentricity angle. At this time, additional defocus power that eliminates the degradation in defocus power caused by RPR is added to the defocus power uniformly set for the defocus areas, according to the position corresponding to a predetermined eccentricity angle.

Defocus areas at positions corresponding to a larger eccentricity angle may be set to be larger than defocus areas at positions corresponding to a smaller eccentricity angle. The spot that the diverging rays from the focal position of the defocus area form on the retina is thereby larger. As a result, this compensates for the reduction in spot size due to RPR.

The method that involves increasing the defocus power may be combined with the method that involves enlarging the defocus area.

"Defocus power" is the refractive power resulting from the shape and/or the material of the defocus areas, and refers to the difference between the average of the defocus value at a focal position X corresponding to each defocus area and the focus value at a focal position Y at which rays passing through a portion (the base area) other than the defocus areas converges and located inside of the plurality of focal positions X. In other words, "defocus power" is the difference obtained by subtracting the refractive power of the base area from the average value of the minimum refractive power and the maximum refractive power of the defocus areas. Therefore, defocus power is also referred to as "average defocus power". In this specification, the case where the defocus areas are convex areas will be illustrated.

"Refractive power" in this specification refers to the average refractive power which is the average value of the refractive power in a direction a in which refractive power is a minimum and the refractive power of a direction b (perpendicular to the direction a) in which refractive power is a maximum.

As long as the defocus areas are provided with a defocus power that eliminates the degradation in the defocus power caused by RPR, there is no limitation to the surface shape of the defocus areas. The defocus areas may have a spherical shape, an aspherical shape, a cylinder shape, or be a mixture of these shapes (e.g., the center part of each defocus area has a spherical shape and the peripheral part outside the center part has an aspherical shape).

According to the one aspect of the present disclosure, a technology for inhibition of myopia progression adapted to the RPR of the wearer can be provided. As an example, it is possible to compensate for the change in spot size accompanying defocusing on the peripheral retina due to RPR, effectively inhibit ocular growth, and delay myopia progression.

"Compensating for the change in retinal spot size due to RPR" in this specification means approximating the state prior to the change in spot size, and includes returning to the pre-change state and partially returning from the post-change state to the pre-change state even if not fully returning to the pre-change state, and also includes a state where the spot conversely becomes larger than the pre-change state. "Compensating for the change in spot size" means "canceling the change in spot size".

Hereinafter, a method of calculating the change in spot size will be described.

FIG. 3 is a diagram illustrating a ray tracing method for deriving a retinal spot.

The shape (major/minor axis ratio of ellipse) and size of a retinal spot caused by the defocus areas can be calculated by the method described below.

First, the rays that pass through the center of the defocus areas and the pupil center of the eye and ultimately reach the retina are determined. The rays in the vicinity of the chief ray are then traced. Incident rays parallel to the chief ray that pass through the peripheral defocus area are traced, and the locus of retinal arrival points is the range of the spot.

The smallness of the defocus areas of the DIMS means there is also an even simpler method of paraxial ray tracing.

In the case where the spectacle lens and the eye model have rotational symmetry about the optical axis, the chief ray and the optical axis are in the same plane. In this case, paraxial ray tracing is realized separately for the tangential direction and the sagittal direction. The exit angle is calculated using formulas for refraction from the height h and the entrance angle μ of a first surface, and serves as the entrance angle of the next surface. The height $h_{+1}$ of the next surface is calculated with formulas for propagation from the height and the exit angle of the previous surface. The height on the retina is found by performing relay calculations in this way. As long as the tangential and sagittal heights are known, the retinal spot ellipse will be determined. The formulas for refraction and the formulas for propagation are as follows.

$$\mu'_{ti} = \frac{n_i \mu_{ti} \cos\theta_i + C_{ti} h_{ti}(n'_i \cos\theta'_i - n_i \cos\theta_i)}{n'_i \cos\theta'_i}$$ [Formula 1]

$$h_{ti+1} = \frac{h_{ti}\cos\theta'_i - q_i \mu'_{ti}}{\cos\theta_{i+1}}$$

$$\mu'_{si} = \frac{n_i \mu_{si} + C_{si} h_{si}(n'_i \cos\theta'_i - n_i \cos\theta_i)}{n'_i}$$

$$h_{si+1} = h_{si} - q_i \mu'_{si}$$

Here, $n_i$ and $n_i'$ are the refractive indices of front media and back media of the ith surface.

$\theta_i$, and $\theta_i'$ are the entrance angle and exit angle of the chief ray that is incident on the ith surface.

$q_i$ is the length of the rays from the ith surface to the i+1th surface.

$h_{ti}$, $\mu_{ti}$, and $\mu_{ti}'$ are the tangential height, paraxial entrance angle and paraxial exit angle of proximal rays on the ith surface.

The tangential paraxial exit angle $\mu_{ti}'$ of the ith surface is the same as the tangential paraxial entrance angle $\mu_{ti+1}$ of the i+1th surface, that is, $\mu_{ti+1} = \mu_{ti}'$.

$C_{ti}$ is the tangential curvature of the ith surface.

Similarly, $h_{si}$, $\mu_{si}$, and $\mu_{si}'$ are the sagittal height, paraxial entrance angle and paraxial exit angle of proximal rays on the ith surface.

The sagittal paraxial exit angle $\mu_{si}'$ of the ith surface is the same as the sagittal paraxial entrance angle $\mu_{si+1}$ of the i+1th surface, that is, $\mu_{si+1} = \mu_{si}'$.

$C_{si}$ is the sagittal curvature of the ith surface.

When ray tracing is performed sequentially with the surface of the defocus area as the first surface, and $h_{t0} = h_{s0} = 1$ and $\mu_{t0} = \mu_{s0} = 0$ are set, the retinal heights $h_{t6}$ and $h_{s6}$ are obtained, the ratios $h_{t6}/h_{t0}$ and $h_{s6}/h_{s0}$ of the size of the retinal spot and the size of the defocus area are determined, and the size and shape of the retinal spot are determined. "Spot size" as referred to here is a concept that includes at least one of the size and shape of the spot.

Favorable Examples and Variation of Spectacle Lens

Favorable examples and variations of the spectacle lens (DIMS) in the one aspect of the present disclosure will be described below.

One or both of the defocus power and size are preferably set so as to compensate for the change in retinal spot size due to RPR, for not less than 80% of the total number of defocus areas in the DIMS. This favorably applies to not less than 90%, and more favorably to not less than 95% of the total number of defocus areas. Henceforth, the favorable example of "not less than 80% of the total number of defocus areas" is changed to not less than 90% and not less than 95% in favorable order similarly to the above, and redundant description will be omitted.

The size of each defocus area may be equal and the defocus power of each defocus area may be set so as to compensate for the change in retinal spot size due to the RPR in not less than 80% of the plurality of defocus areas (specific example 1). This state is also referred to as a "state in which an equal defocus area size is uniformly set for each defocus area".

Also, the defocus power of each defocus area may be equal and the size of each defocus area may be set so as to compensate for the change in retinal spot size due to the RPR in not less than 80% of the plurality of defocus areas (specific example 2). This state is also referred to as a "state in which an equal defocus power is uniformly set for each defocus area".

The refractive power of the center portion in the defocus area of not less than 80% of the total number of defocus areas in the DIMS may be equal. "The center portion" of the defocus area in this specification is where the center of gravity located in plan view, and, in the case where the defocus area is a small lens, is where the vertex is located. Even in this state, the technical idea of the present disclosure is realized, as long as the change in retina spot size due to RPR is compensated for in at least some defocus areas as a result. The state in which an equal defocus power is uniformly set for each defocus area may be configured in not less than 80% of the total number of defocus areas that compensated for the change in retina spot size.

"Equal" or "constant" in this specification refers to a fluctuation range within ±10% (favorably within ±5%, more favorably within ±1%). For example, in the case where the defocus power in a predetermined defocus area s is 1.5 D, the defocus power in another defocus area t is 1.6 D, and the defocus power in yet another defocus area u is 1.7 D, the defocus power of the defocus area t is 1.6 D, and 1/10 thereof is 0.16 D. The defocus power of the defocus area s and the defocus power of the defocus area u are both within a range of ±0.16 D from 1.6 D. Thus, in this specification, the defocus areas s to u are regarded as having equal or constant defocus power.

Preferably not less than 80% of the plurality of defocus areas have a cylinder shape that cancels the astigmatic component (difference between maximum refractive power and minimum refractive power) caused by RPR that depends on the eccentricity angle corresponding to the position of each defocus area. This astigmatic component corrects for oblique astigmatism. This correction is also referred to as "cancellation".

The favorability of such a configuration will be discussed in detail in the Design method for Spectacle Lens section, and, as shown in FIGS. 7A-7D, which will be taken up later, the astigmatic component of RPR increases due to RPR increasing, and spot size becomes ovalized. Each defocus area of the not less than 80% of the plurality of defocus areas preferably has a cylinder shape, in order to cancel this ovalization and approximate a perfect circle again, that is, in order to make oblique astigmatism correctable.

In the cylinder-shaped defocus areas, the amount of residual astigmatism after canceling the astigmatic component of the RPR is preferably not more than one third of the actual defocus power of each defocus area.

By correcting oblique astigmatism to some extent (to the extent described in the above paragraph), each spot that is formed on the retina spreads substantially circularly and uniformly due to the defocus areas. This results in a comfortable wearing feel, and a stable myopia progression inhibitory effect can also be expected.

Note that the cylinder shape of each defocus area may be achieved by combining the above specific examples 1 and 2.

"The actual defocus power" in this specification refers to the power after subtracting the equivalent spherical power (i.e., average value of maximum power and minimum power) of RPR that depends on the eccentricity angle corresponding to the position of each defocus area from the defocus power of each defocus area.

In not less than 80% of the plurality of defocus areas, the actual defocus power of each defocus area after subtracting the equivalent spherical of RPR that depends on the eccentricity angle corresponding to the position of the defocus area from the defocus power of the defocus area is preferably in a range of 1.0-4.5 D. As long as the actual defocus power can be secured in this range, a stable myopia progression inhibitory effect can be expected.

Note that although there is no limitation in the specific numerical value of the defocus power prior to subtracting the spherical equivalent of RPR, preferably the minimum value of defocus power produced by the defocus areas on the DIMS is within a range of 0.5-4.5 D and the maximum value is within a range of 3.0-10.0 D, for example. The difference between the maximum value and the minimum value is preferably within a range of 1.0-5.0 D.

Example of Spectacle Lens

The mode of disposition of the plurality of defocus areas is not particularly limited, and can, for example, be determined from viewpoints such as visibility outside the defocus areas, imparting of designability due to the defocus areas, and adjustment of refractive power due to the defocus areas.

Although a detailed description will be given later in the Design Method for Spectacle Lens section, approximately circular defocus areas may be disposed in an island-like manner (i.e., in a separated state not adjacent to each other) equidistantly in the sagittal direction and the tangential direction around the lens center part, as shown in FIGS. 9 to 12. An example in which the defocus areas are discretely disposed independently such that the center of each convex area is the vertex of an equilateral triangle (are disposed with center of each defocus area at the vertex of a honeycomb structure) is given as an example of disposition of the defocus areas in plan view. In this case, the interval between defocus areas may be 1.0-2.0 mm. Also, the number of defocus areas may be 100-100000.

The one aspect of the present disclosure is, however, not limited to the contents described in Patent Document 1. That is, the defocus areas are not limited to being in a separated state not adjacent to each other, and may come in contact with each other, and non-independent disposition such as linking the defocus areas together may be employed.

Each of the defocus areas is constituted as follows, for example. The diameter of the defocus area is favorably about 0.6-2.0 mm. The protruding height (protruding amount) of the defocus area is about 0.1-10 μm, and preferably about 0.4-2.0 μm.

Spectacle Lens Design Method

The present disclosure is also applicable to a design method for a spectacle lens (DIMS). Specifically, a setting process of setting at least one of the defocus power and size of each defocus area, so as to compensate for the change in retinal spot size due to RPR that depends on the eccentricity angle of the eye of the wearer, in not less than half of the plurality of defocus areas is provided. The details of the contents of the constituent elements of this design method overlap with the contents of the Spectacle Lens section, and are thus omitted. The contents described henceforth mainly concern contents that are not in the Spectacle Lens section. Note that the technical idea of the present disclosure is also reflected in the method of manufacturing a spectacle lens designed using this design method.

Design of Spectacle Lens Based on Case of Wearer

FIG. 4 is a graph showing the relation (i.e., case) of a subject between RPR and the eccentricity angle of the eye of the wearer on the horizontal meridian that passes through a passing point on the spectacle lens of the line of sight of the frontal gaze. SE is the average value of tangential refractive power and sagittal refractive power, that is, the average refractive power.

"The predetermined eccentricity angle on the horizontal meridian" is the angle between the frontal gaze direction and the direction of the fixation target on the horizontal meridian. In the one aspect of the present disclosure, the fixation target is set to each of 10 degrees (10N), 20 degrees (20N), and 30 degrees (30N) on the nasal side. Also, the fixation target is set to each of 10 degrees (10 T), 20 degrees (20 T), and degrees (30 T) on the temporal side.

As the same eccentricity angle (e.g., 20N and 20 T), the RPR of the nasal portion of the peripheral retina is larger than the RPR of the temporal portion in many cases, as shown in FIG. 4. The lens temporal defocus areas act on the peripheral retina near the nasal side. Thus, the defocus power imparted on the lens temporal defocus areas and/or the size of these defocus areas are desirably designed to be larger than the size of the lens nasal defocus areas at the same distance from the lens center part.

Naturally, there is also the case where, conversely to FIG. 4, the RPR of the nasal portion of the peripheral retina is smaller than the RPR of the temporal portion. The following is a favorable example that is also adaptable to this case. "In the case where the RPR on the nasal side of the retina at the same eccentricity angle differs from the RPR of the temporal side, the set pattern of at least one of defocus power and size with respect to each defocus area differs between the plurality of defocus areas disposed on the nasal side of the lens and the plurality of defocus areas disposed on the temporal side of the lens."

In the case where the RPR on the nasal side of the peripheral retina is higher than the temporal RPR at the same eccentricity angle (e.g., 20N and 20 T), preferably the plurality of lens temporal defocus areas are set to a higher defocus power and/or to a larger defocus area than the plurality of lens nasal defocus areas.

Usually, the value of RPR is larger the larger the eccentricity angle. Thus, preferably the defocus power of the defocus area increases and/or the size of the defocus area increases from the center part toward the peripheral part of the spectacle lens.

On the other hand, there is also the case where the value of RPR is smaller the larger the eccentricity angle. In this case, preferably the defocus power of the defocus area decreases and/or the size of the defocus area decreases from the center part toward the peripheral part of the spectacle lens.

There is the case where the value of RPR initially increases and thereafter decreases the larger the eccentricity angle. In this case, preferably the defocus power of the defocus area decreases after increasing and/or the size of the defocus area decreases after increasing from the center part toward the peripheral part of the spectacle lens.

There is the case where the value of RPR initially decreases and thereafter increases the larger the eccentricity angle. In this case, preferably the defocus power of the defocus area increases after decreasing and/or the size of the defocus area increases after decreasing from the center part toward the peripheral part of the spectacle lens.

The following are configurations in which the above cases are reflected in the spectacle lens.

The set pattern of defocus power with respect to each defocus area differ between the plurality of defocus areas disposed on the nasal side and the plurality of defocus areas disposed on the temporal side.

The plurality of defocus areas disposed on the nasal side have a higher defocus power and/or a larger set pattern than the plurality of defocus areas disposed on the temporal side.

the defocus power of each defocus area increases and/or the size of each defocus area increases from the center part toward the peripheral part of the spectacle lens.

the defocus power of each defocus area decreases and/or the size of each defocus area decreases from the center part toward the peripheral part of the spectacle lens.

the defocus power of each defocus area decreases after increasing or the size of each defocus area decreases after increasing or the defocus power of each defocus area increases after decreasing or the size of each defocus area increases after decreasing from the center part toward the peripheral part of the spectacle lens.

There is no limitation to the specific numerical values of the defocus power and size of the defocus areas, and there is also no limitation in the number of defocus areas. Also, the defocus power and/or size of the defocus areas may change continuously or may change discontinuously (stepwise) as the position on the lens moves from the center part toward the peripheral part, Position Conversion Process for Calculating Position on Spectacle Lens Corresponding to Eccentricity Angle The position of the spectacle lens corresponding to the eccentricity angle in a state where the eyes are directed straight ahead will be the point straight lines forming the optical axis and the eccentricity angle extend from the entrance pupil position of the eye and intersect the spectacle lens. However, considering that the eye is constantly rotating, the method that involves determining the correspondence relation between the eccentricity angle and the position on the lens in this way is not necessarily the best method.

FIG. 5 is a diagram showing an outline of using an eccentricity angle of the eye of the wearer to calculate the position on the lens corresponding to this eccentricity angle. Point E indicates the point at which the rays that reach point A' (fovea) pass through the lens object-side surface. Point F indicates the point at which the rays that reach point B' (peripheral retina) pass through the lens object-side surface.

The eyes constantly rotate to look at things. Thus, the position on the lens does not correspond one-to-one with a specific position on the retina. Henceforth, this one-to-one correspondence will also be referred to as a link. When both positions are not linked, it is difficult to calculate the position on the lens corresponding to the eccentricity angle. Difficulty in calculating this position ultimately makes it difficult to set the position on the lens at which to dispose of the defocus areas, and also what defocus power and what size to set for the defocus areas.

In view of this, in the range in the center part including the frontal line of sight passing point on the lens, it is assumed that the eye is constantly rotating to look at things, and that the point on the lens is linked to the retinal fovea. This range is the range covered by rotation. An example is displayed in FIG. 5.

A specific range on the lens from a rotation angle of zero degrees to 10 degrees (Max rotation angle (10 degrees), Covered by rotation in FIG. 5) is set as the range covered by rotation, and is assumed to be linked to the retina central-fovea position (FIG. 5). A position outside the range on the lens covered by rotation is linked to the peripheral retina of a specific eccentricity angle. The relation between the position on the lens and the eccentricity angle at that time is also shown in FIG. 5. An E point on the boundary of the range covered by rotation is on a straight line formed by the F point and the frontal line-of-sight passing point O positioned on the lens. When the eye is rotated such that the E point is the frontal line-of-sight passing point, the rays that pass through the F point and the entrance pupil P are traced. ∠APB, that is, α is the eccentricity angle, and links to the B' point on the retina.

Although the link relation between a position on the lens and a position on the retina determined in this way is not always maintained, the defocus power error that occurs is limited even if this relation is not maintained.

The following is a configuration that integrates the above contents.

"In the position conversion process, where an area whose center is the passing point on the spectacle lens of the line of sight of the frontal gaze and whose radius is one value within a range of 2-6 mm is set as the range covered by rotation, and the eccentricity angle corresponding to a position within the range is set to zero, the eccentricity angle corresponding to a predetermined position on the lens outside the range covered by rotation is the angle formed by the optical axis of the eye and a straight line connecting the predetermined position and the entrance pupil of the eye, after having performed eye rotation such that the line of sight passes through a point on the boundary of the range covered by rotation that is on a straight line formed by the predetermined position and the passing point on the spectacle lens of the line of sight of the frontal gaze."

For example, in the case where a rotation angle of not more than 10 degrees from the frontal direction is set as the range covered by rotation, the radius of the rotation range of the eye on the spectacle lens will be the distance from the rotation center to the lens (about 27 mm)×tan 10 degrees, that is, approximately 4.8 mm. The inner circle range of the 4.8 mm radius from the lens center is assumed to be covered by the rotation of the eye and linked to the fovea.

A position on the lens outside the radius of 4.8 mm is linked to the retinal arrival point of rays that pass through that position and through the pupil of the eye, when the eye is rotated to a position of 4.8 mm on the meridian connecting to that position from the lens center. FIG. 5 shows the relation between positions on the lens and the eccentricity angle in this example. An example of this relation is shown in the following table.

TABLE 1

| Eccentricity angle (degrees) | 0 | 10 | 20 | 30 | 40 |
|---|---|---|---|---|---|
| Radial position r(mm) | ≤4.8 | 7.6 | 10.8 | 14.8 | 20.2 |

The calculation conditions of this relation were set such that the distance from the lens surface to the rotation center point was CR=27 mm, the distance from the entrance pupil position P of the eye to the rotation center was PR=12 mm, and the angle (radius) covered by rotation was 10 degrees. With this method, the RPR measurement point (position on peripheral retina) and, therefore, the position on the lens obtained from the eccentricity angle can be determined on the horizontal meridian that at least passes through the lens center. With the above technique, the graph of FIG. 4 can be converted to FIG. 6.

FIG. 6 is a graph showing the relation between RPR and the lens horizontal position corresponding to respective eccentricity angles for the subject related to FIG. 4.

Note that, in the position conversion process, an eccentricity angle corresponding to a predetermined position on the lens may be calculated, or a position on the lens corresponding to a predetermined eccentricity angle may be calculated. In either case, in the setting process, at least one of the defocus power and size of each defocus area need only be set, so as to compensate for the change in retinal spot size due to RPR at the eccentricity angle corresponding to that position.

Expansion of Data on RPR on Horizontal Meridian Beyond Horizontal Meridian

In the case where there is only RPR data on the horizontal meridian, RPR on radiation other than horizontal meridian may be inferred from the nasal RPR and temporal RPR on the horizontal meridian of the same eccentricity angle with the following formula, for example.

$$P(\varphi) = P(0)\left(\cos\frac{\varphi}{2}\right)^2 + P(180)\left(\sin\frac{\varphi}{2}\right)^2 \quad \text{[Formula 2]}$$

Here, P(φ) is the value of RPR at the azimuthal angle φ, with φ=0° being nasal and φ=180° being temporal.

The position on the lens on the horizontal meridian obtained through conversion from the eccentricity angle may be expanded beyond the horizontal meridian using the above formula.

As long as the distribution of RPR with respect to positions on the lens is obtained, the defocus power and size of a plurality of defocus areas can be set, so as to form spots of uniform shape and size on the retina, for example.

In many cases, the astigmatism axis of the astigmatic component in RPR is close to 0 degrees or 90 degrees. Thus, the refractive powers of both principal meridians may be taken as tangential refractive power and sagittal refractive power.

FIG. 6 is a graph showing the relation between RPR and the lens horizontal position corresponding to respective eccentricity angles for the subject related to FIG. 4.

When the eccentricity angles are converted to positions on the lens with the above method, an RPR curve at the cross-sectional position of the lens center (=geometric center) is obtained (FIG. 6).

As described in relation to FIG. 4, it is the lens temporal defocus areas that acts on the peripheral retina near the nasal side. Thus, the spectacle lens is desirably designed such that the defocus power imparted on the lens temporal defocus areas and/or the size of these defocus areas are larger than the lens nasal defocus areas located at the same distance from the lens center part.

For example, in the case where the size of the defocus areas is uniform and the actual defocus power is set to 2.5 D, a skew defocus power related to off-axis rays is a value obtained by adding the spherical equivalent of RPR to the actual defocus power.

This skew defocus power is, in terms of FIG. 5, a value obtained by subtracting the prescription power from the wavefront power at an RPR power evaluation point B on the lens eye-side surface though which rays that are obliquely incident on lens point F so as to enter the eye at a predetermined eccentricity angle pass. This value, although close to the surface power of the defocus areas, is strictly different.

Formation of Cylinder Shape of Defocus Area

FIGS. 7A-7D are diagrams showing an outline of the shape of the spots in case the defocus areas have a cylinder shape in the one aspect of the present disclosure.

Oblique astigmatism also occurs, apart from oblique power error included in RPR. "Oblique" means at an angle to the optical axis of the frontal gaze.

There are cases where astigmatism persists when astigmatism that occurs with incidence of off-axis rays is added to oblique astigmatism that is included in RPR due to the defocus areas on the spectacle lens having a spherical shape. This astigmatism is also referred to as residual astigmatism.

In the case where there is significant residual astigmatism in the actual defocus power, the tangential focal point and the sagittal focal point resulting from a defocus area differ, as shown in FIG. 7A. This leads to a difference between a distance $l_t$ from a point on the peripheral retina to the focal point resulting from tangential defocus power and a distance $l_s$ from the point of the peripheral retina to the focal point resulting from sagittal defocus power.

When that occurs, the tangential size of the shape of the spot (Blur Spot at peripheral retina in FIG. 7B) formed on the peripheral retina becoming larger than the sagittal size, as shown in FIG. 7B, and, as a result, the spot may degenerate into an elongated range, and become an impediment to the original object of exhibiting an myopia progression inhibitory effect.

Also, on the peripheral retina, the rays are often not orthogonal to the tangential plane of the retina, as shown by the β angle in FIG. 7A. As a result, even if sagittal defocus power and tangential defocus power of the defocus areas are the same, spots that differ between the tangential size and the sagittal size can form on the peripheral retina.

As shown in FIG. 7C, by employing cylinder-shaped defocus areas, the shape of defocus areas in plan view approaches an ellipse rather than a circle, whereas the retinal spots can be returned to a state approaching a circle. As a result, a myopia progression inhibition function is effectively exhibited. For example, not less than 80% of the plurality of defocus areas preferably have a cylinder shape that cancels the astigmatism component caused by RPR that depends on the eccentricity angle corresponding to the position of each defocus area.

In specific terms, preferably the defocus areas are designed to have a cylinder shape, and residual astigmatism is reduced by adjusting the astigmatic power and astigmatism axis. In each cylinder-shaped defocus area, the amount of residual astigmatism after canceling the astigmatic component of the RPR preferably is not more than one third of the actual defocus power of the defocus area after subtracting the spherical equivalent of RPR that depends on the eccentricity angle corresponding to the position of the defocus area from the defocus power of the defocus area.

Note that there is a possibly of not being able to return the retinal spots to a circle simply by eliminating oblique astigmatism. This is because, even if oblique astigmatism is eliminated, there is no change in the fact that the rays are not orthogonal to the retina surface on the peripheral retina, and, in the end, the sagittal size of the spots will be larger than the tangential size.

The following is an example definition of the cylinder shape.

$$x = \frac{C_y y^2 + C_z z^2}{1 + \sqrt{1 - \frac{(C_y y^2 + C_z z^2)^2}{y^2 + z^2}}} \qquad \text{[Formula 3]}$$

The y direction is the tangential direction, the z direction is the sagittal direction, and the x direction is the normal direction. When defocus areas having this shape are disposed on the spectacle lens, the tangential size of the defocus area in plan view differs from the sagittal size. The size of the defocus area in plan view may, as shown in FIGS. 7C and 7D, be represented by the size in a 45 degree direction (so-called nominal size), or may be represented by the square root of the product of the sizes in both directions.

Construction of Eye Model

As long as there is data on the RPR at each eccentricity angle and data on the axial length AL, an eye model can be constructed. In specific terms, as long as there is data on the axial length, the position on the optical axis of the retina, that is, the position of point A' (fovea), is known. As long as there is data on the RPR at each eccentricity angle, each position on the peripheral retina can be determined. As a result, retina shape data can be constructed, by connecting the position of point A' (fovea), and each position of the peripheral retina. An eye model can thereby be constructed. The eye model is used when calculating the change in spot size.

An example of the construction method of the eye model will be described. As shown in FIG. 2, it is assumed that the eye is constituted by the front and back surfaces of the cornea, the pupil, and the front and back surfaces of the crystalline lens.

The shape of the cornea employs actual measurement values or values in documents and the like. As long as the axial length is known, the refractive power of the crystalline lens is known, and, for example, the curvature of the back surface of the crystalline lens is determined.

It is possible to deduce the position of retinal point B' with the measurement values of RPR of the off-axis rays of the eccentricity angle α. It is possible to at least calculate a plurality of points on the horizontal meridian of the retina, with the RPR value at a plurality of eccentricity angles.

As shown above (expansion of data on RPR on the horizontal meridian beyond the horizontal meridian), it is possible to extend the definition of the shape on the horizontal meridian to the entire retina. As long as retina surface shape is known, the normal of the retina at the retinal arrival point of rays is determined, and the β angle in FIG. 7A is determined. It is possible to trace the astigmatism of off-axis rays in this state, and to derive the tangential and sagittal sizes and shapes of retinal spots resulting from the lens defocus areas.

Data on the RPR of the subject may be used as data on the RPR at each eccentricity angle. In this case, individual design is possible ("individual design mode" described later). On the other hand, rather than data on the RPR of the subject, a plurality of sets of different types of data on RPR may be prepared in advance, and a set of data on typical RPR may be selected for the subject ("existing design mode" described later). For example, in the case where the subject is a male aged 10-12, the average value of data on the RPR of ages 10-12 and male may be employed as data of the RPR of this subject.

Similarly, data on the axial length of the subject may be used as data on the axial length. In this case, individual design is possible. On the other hand, similarly to RPR, rather than data on the axial length of the subject, a plurality of sets of different types of data on axial length may be prepared in advance, and a set of data on typical axial lengths may be selected for the subject. For example, in the case where the subject is male aged 10-12, the average value of data on the axial length of ages 10-12 and male may be employed as data of the axial length of this subject.

Application Example 1

An application example using the contents described so far will be illustrated. In this application example, a case will be described where the size of the defocus areas is equal, whereas the defocus power of a spherical-shaped defocus area is set to a value obtained by adding 2.5 D to the spherical equivalent of RPR. That is, an example based on the above specific example 1 will be described.

In the case of the above example, an actual defocus power close to 2.5 D is finally obtained with of any of the eccentricity angles. Thus, the following formula are realized.

$$P_{def} = RPR_{SE} + 2.5 \qquad \text{[Formula 4]}$$

$P_{def}$ is the actual defocus power, and the $RPR_{SE}$ is the spherical equivalent of RPR. Defocus SE in FIG. 8 is the curve obtained using this relation.

FIG. 8 is a graph showing the relation between the power of defocus areas designed in correspondence with the case in FIG. 4 and the lens horizontal position.

The data of the horizontal axis in FIG. 8 is data obtained by calculating the lens horizontal position from the eccentricity angle, in accordance with the position conversion process of calculating the position on the lens corresponding to the eccentricity angle. The defocus power curve of the defocus area at a cross-sectional position of the lens center is a curve Defocus SE in FIG. 8.

When the curve Defocus SE in FIG. 8 is extended to the lens surface using formula 2, the distribution of defocus areas shown in FIG. 9 is obtained.

FIG. 9 is a schematic plan view of a spectacle lens corresponding to the case in FIG. 4 in which the defocus areas are each discretely disposed independently such that the center of the defocus area of a spherical shape design in plan view will form an equilateral triangle array distribution. This means that defocus power is greater the darker the color.

Furthermore, the case where the formation of the cylinder shape of the defocus area is applied to the above example will be illustrated below.

When the surface shape of the defocus areas is formed into a cylinder shape while making the size of the defocus areas equal, the astigmatic component in RPR can also be canceled. For example, the tangential defocus power and the sagittal defocus power produced by the cylinder shape of the defocus areas are set as follows.

$$P_{Tangential} = RPR_{Sagittal} + 2.5$$

$$P_{Sagittal} = RPR_{Tangential} + 2.5 \qquad \text{[Formula 5]}$$

$P_{Tangential}$ is the tangential defocus power, $P_{Sagittal}$ is the sagittal defocus power, $RPR_{Tangential}$ is the tangential component of RPR, and $RPR_{Sagittal}$ is the sagittal component of RPR. Defocus Tangential and Defocus Sagittal in FIG. 8 are the curves obtained using this relation.

When the contents of both curves in FIG. 8 are extended to the lens surface using formula 2, the distribution of defocus areas shown in FIG. 10 is obtained.

FIG. 10 is a schematic plan view of a spectacle lens corresponding to the case in FIG. 4 in which the defocus areas in FIG. 9 are changed to a cylinder shape design in plan view whose major axis is in the tangential direction and whose minor axis is in the sagittal direction. This means that defocus power is greater the darker the color. The major/minor axis ratio of the ellipse indicates the power difference between both principal meridians.

In the case of FIG. 10, the element of rays being obliquely incident on the spectacle lens and the element relating to the evaluation point F being slightly distanced from the lens are disregarded. Thus, the astigmatic component of actual defocus power can be reduced although not completely canceled. As long as the powers of both principal meridians are finely adjusted, it is possible to cancel this astigmatic component completely. As mentioned previously, it is also possible, however, to design the spectacle lens such that the astigmatic component of actual defocus power is intentionally left, and the spot range formed on the retina forms a circle due to the astigmatic component that was left. The change before and after correction of the spot range will be described in a specific example using application examples 1 and 2 which will be described later.

Application Example 2

In this application example, conversely to application example 1, the case where the size of the defocus area is set so as to compensate for the change in spot size due to RPR while making defocus power of the defocus areas equal will be described. That is, an example based on the specific example 2 will be described.

FIG. 11 is a schematic plan view of a spectacle lens in which the defocus areas in FIG. 9 are modified so as to set the size of the defocus areas to correspond to the case in FIG. 4, while making the defocus power of the defocus areas equal. This means that the defocus areas are larger the darker the color.

Furthermore, the above formation of the cylinder shape of the defocus areas may be applied to the above example. That is, the cylinder shape is employed for the defocus areas, without changing the average power (SE) of the defocus areas. The size of each defocus area may be determined, such that the astigmatic component of RPR that depends on the eccentricity angle corresponding to the position of a defocus area may be corrected by the cylinder shape of the defocus areas.

FIG. 12 is a schematic plan view of a spectacle lens corresponding to the case in FIG. 4 in which the defocus areas in FIG. 11 are changed to a cylinder shape design in plan view whose major axis is in the tangential direction and whose minor axis is in the sagittal direction. This means that the defocus areas are larger the darker the color.

Specific Example Using Application Examples 1 and 2

FIGS. 13A-13B are diagrams showing the distribution of retinal spot sizes (FIG. 13B) in the case where the defocus power and size of the defocus areas are equal (FIG. 13A). This means that the spots are smaller the darker the color.

FIGS. 14A-14C are diagrams showing the distribution of retinal spot sizes (FIG. 14C) in the case where the defocus power of each defocus area is set, while the size of each defocus area is equal (FIG. 14A; approx. same as FIG. 9), or in the case where the size of each defocus area is set, while the defocus power of each defocus area is equal (FIG. 14B; approx. same as FIG. 11). This means that defocus power is greater the darker the color.

FIGS. 15A-15C are diagrams showing the distribution of retinal spot sizes (FIG. 15C) in the case where the defocus areas in FIG. 9 are changed to a cylinder shape design in plan view whose major axis is in the tangential direction and whose minor axis is in sagittal direction (FIG. 15A; approx. same as FIG. 10), or in the case where the defocus areas in FIG. 11 are changed to a cylinder shape design in plan view whose major axis is in the tangential direction and whose minor axis is in sagittal direction (FIG. 15B; approx. same as FIG. 12). This means that defocus power is greater the darker the color.

As shown in FIG. 13B, the size of spots differs between the vicinity of the fovea and the peripheral retina, with the spots becoming smaller toward the peripheral retina. This means that the myopia progression inhibitory effect decreases. In this example, the shape of the spots becomes larger in the sagittal direction than the tangential direction.

In view of this, when the design of FIG. 14A (application example 1) or the design of FIG. 14B (application example 2) is employed, the area of each spot size will be equal, as shown in FIG. 14C. That is, the actual defocus power that the wearer should obtain will be sufficiently obtained, even on the peripheral retina.

On the other hand, RPR increases toward the peripheral retina, accompanied by an increase in the astigmatic component. As a result, the spot range will be elliptical, even though the area of each spot size is equal.

In view of this, the design of FIG. 15A (cylinder shape of application example 1) or the design of FIG. 15B (cylinder shape of application example 2) is employed. In FIGS. 15A and 15B, the difference in power between both principal meridians and tangential and sagittal sizes of each defocus area are changed according to the RPR of the case in FIG. 3. As a result, as shown in FIG. 15C, the area of each spot size becomes equal, and the spot range can also be returned to circular.

That is, not less than 80% of the plurality of defocus areas preferably have a cylinder shape that cancels astigmatism due to RPR that depends on the eccentricity angle corresponding to the position of each defocus area, and the major/minor axis ratio (tangential size/sagittal size) of the spot size of the wearer is preferably equal (fluctuation range within ±10% (favorably within ±5%, more favorably within ±1%)).

Application Example 3

Naturally, it is possible to compensate for the change in shape and size of the retinal spots due to RPR that depends on the eccentricity angle corresponding to the position thereof by changing both the power and size of the defocus areas, and the myopia progression inhibitory effect can be expected to improve.

Spectacle Lens Design System

The present disclosure is also applicable to a design system for a spectacle lens (DIMS). The following is the configuration of the spectacle lens design system. The technical idea of the present disclosure is also reflected in a system for manufacturing spectacle lenses designed by the system. The technical idea of the present disclosure is also reflected in a system for supplying spectacle lenses designed by the system.

"The design system for a spectacle lens includes a first selection unit that selects an individual design mode of setting, in not less than half of the plurality of defocus areas, at least one of a defocus power and a size of each defocus area, so as to compensate for a change in retinal spot size due to relative peripheral refraction (RPR) that depends on an eccentricity angle from a frontal gaze on the retina of the eye of a wearer, or selects an existing design mode of employing one from a plurality of pre-prepared design data that includes the base area and the plurality of defocus areas and whose patterns of the defocus areas are mutually different."

The "patterns of the defocus area" in the above paragraph refers to at least one of the defocus power distribution, disposition (e.g., whether or not a honeycomb structure is employed, separation distance, etc.), shape and size of the defocus areas.

The spectacle lens design system is illustrated as a supply system. The following is one specific example of the configuration of the supply system. The present disclosure is not limited to the following specific example.

FIG. 16 is a schematic view showing an example configuration of the spectacle lens supply system according to the one aspect of the present disclosure.

The illustrated spectacle lens supply system 1 has a configuration in which an ordering side apparatus 2 that places orders for spectacle lenses and an order-receiving side apparatus 3 that receives orders for spectacle lenses are connected to each other in a communicable manner by a communication network 4. The ordering side apparatus 2 is, for example, installed for use in an optician, and the order-receiving side apparatus 3 is, for example, installed for use in a factory that manufactures spectacle lenses. The communication network 4 is, for example, constituted by the Internet or a dedicated line. In this spectacle lens supply system 1, information required for ordering spectacle lenses is sent to the order-receiving side apparatus 3 via the communication network 4. In the order-receiving side apparatus 3, required spectacle lens processing is then performed using the received information, and spectacle lenses that have passed inspection and the like and been judged to be non-defective are finally delivered to the optician that placed the order. Spectacle lens processing includes processing for polishing the optical surface of the spectacle lens and processing for shaping the lens for inserting into a frame.

In the spectacle lens supply system 1 having the above configuration, the correspondence relation between the ordering side apparatus 2 and the order-receiving side apparatus 3 may be one of a 1:1 correspondence relation, an m:1 correspondence relation (m being a natural number not less than 2), a 1:n correspondence relation (n being a natural number not less than 2), and an m:n correspondence relation. Also, the ordering side apparatus 2 and the order-receiving side apparatus 3 may be installed in the same country or may be installed in different countries. Furthermore, although not illustrated, a configuration may be adopted in which various types of servers (e.g., data server, etc.) are connected to the communication network 4, and data is exchanged between this server and the ordering side apparatus 2 or the order-receiving side apparatus 3 as needed.

The ordering side apparatus 2 is constituted by the hardware resources of a computer, and is provided with an input unit 5, a computer unit 6, and a display unit 7. The input unit 5 is for inputting various types of data (information) to the ordering side apparatus 2. The input unit 5 can be constituted using an input operation device such as a keyboard, a mouse, and a touch panel, for example. Data input via the input unit 5 includes ordering information D1. In the case where there is possibility of selecting individual design mode, a value D2 of the RPR of the customer (future wearer), a value D3 of the axial length of the customer (future wearer) and the like may be included.

The ordering information D1 includes spectacle lens prescription information including the addition power of the spectacle lens (power for farsightedness, power for nearsightedness), astigmatism axis, frame information including the type of spectacle frame, material, size and frame shape data, and layout information used in positioning the spectacle lens and the spectacle frame.

The value D2 of RPR is the value of RPR described above, and is the value of RPR that depends on the wearer and depends on the eccentricity angle and the direction of the horizontal meridian.

The value D3 of axial length is the value of the axial length described above.

Computer Unit

The computer unit 6 is constituted using a CPU (Central Processing Unit) which one hardware resource of the computer, a ROM (Read Only Memory), a RAM (Random Access Memory), a HDD (Hard Disk Drive), and the like.

The computer unit 6 is, as shown in FIG. 16, provided with a first selection unit 11, a second selection unit 12, an order processing unit 13, and a storage unit 14. Each of the functional units is realized using the hardware resources of the computer mentioned above. The functional units of the computer unit 6 mentioned above are realized, for example, by the CPU reading out a program stored in the ROM or the HDD to the RAM and executing the program. In this case, it is possible to extract the program as the one aspect of the present disclosure.

Order Processing Unit

The order processing unit 13 performs order processing of spectacle lenses. Specifically, the order processing unit 13 performs processing for extracting information required for ordering spectacle lenses from information input by the input unit 5, and transmitting this information to the order-receiving side apparatus 3 via the communication network 4. Also, the order processing unit 13 performs processing for transmitting information (manufacturer, type, etc.) specifying the spectacle lens finally decided on (determined) by a salesperson obtaining the consent of the wearer to the order-receiving side apparatus 3 via the communication network 4.

Storage Unit

The storage unit 14 is used in order to store various data that is handled by the ordering side apparatus 2. Data stored in the storage unit 14 includes input data, calculation results and the like. In the case where the individual design mode is employed, data on the RPR of the wearer and data on the axial length are included. This information is stored in advance in the storage unit 14, and the first selection unit 11 or the second selection unit 12 refer to this information as needed.

First Selection Unit

The first selection unit 11 has a function of selecting whether to obtain individual design data (FIG. 16) with consideration for RPR that depends on the plurality of eccentricity angles of the eye and the axial length of the wearer in the design of not less than half of the plurality of defocus areas, and or whether to select from a plurality of design data prepared in advance without consideration for this RPR.

As the plurality of design data, for example, data (existing design data 1 in FIG. 16) in which defocus power of the defocus areas is uniformly set to 1.5 D, data (existing design data 2 in FIG. 16) in which defocus power of the defocus areas is uniformly set to 2.5 D, and data (existing design data 3 in FIG. 16) in which defocus power of the defocus areas is uniformly set to 3.5 D with the size of each defocus area set to be equal may be prepared.

Naturally, preparing defocus areas that reflect the RPR of each wearer as described in the Spectacle Lens section is preferably in terms of the myopia progression inhibitory effect. On the other hand, looking at the cost to the wear, it is cheaper to uniformly set the defocus areas to equal defocus power. Also, as long as designs that reflect typical axial lengths and patterns of typical RPRs are prepared, it is also possible to provide lenses at comparatively reasonable prices.

Furthermore, from the perspective of manufacturing spectacle lenses, preparing a plurality of set patterns relating to defocus areas in advance and selecting from these set patterns enables spectacle lenses to be designed quickly. Also, in the case of preparing semi-finished lens in which defocus areas that reflect a plurality of set patterns are formed in advance on a base area having a predetermined curvature, the types of semi-finished lenses that are prepared can be reduced. This is linked to inventory reduction and is economically advantageous.

According to the one aspect of the present disclosure, it becomes possible to prepare a plurality of designs of defocus areas having a uniform defocus power, and/or prepare a plurality of designs reflecting the data of typical axial lengths and the data of typical RPRs, perform simulation using measurement values of the axial length or RPR of customers (using typical values depending on the case) or the measured value (using typical value depending on the case), and, for example, select a design with the least change in the spots formed on the retina by the defocus areas.

The following techniques are given as techniques for selecting a design with least change in the spots.

"In the existing design mode, design data with which the change in retinal spot size due to the RPR of the wearer in each defocus area is smallest is employed, from the plurality of design data."

Determination of the design data with which the change in spot size is smallest may, for example, involve using a least-squares method to select design data with which the change in spot size at each eccentricity angle is smallest.

In summary, in the one aspect of the present disclosure, a technique of individually designing a DIMS lens that reflects RPR described in the Spectacle Lens section, and a technique of extracting a design that most reduces the influence of RPR most from a plurality of DIMS designs prepared in advance can be selected, according to the intentions of the wearer or the person who places the order (or receives the order).

Second Selection Unit

In the one aspect of the present disclosure, the second selection unit 12 is preferably provided. The second selection unit 12 has a function of selecting design parameters, in the case of considering RPR in the design. Selection of a spherical surface or a cylindrical surface as the surface shape of defocus areas, selection of 1.0 mm or 0.8 mm as the diameter of defocus areas, and selection of the interval between defocus areas are given as examples of selection of design parameters.

The second selection unit 12 may be further provided with a function of selecting whether to select one from a plurality of design data as mentioned above or prepare defocus areas that fully reflect the RPR of each wearer.

Computation Unit

In this case, the defocus power set for each defocus area after taking RPR into consideration may be computed by a computation unit 15. The defocus power of the defocus areas in which the RPR of each wearer is fully reflected may be computed by this computation unit. The result of this computation may also be used as material for when selecting one from a plurality of design data using the second selection unit 12. The computation unit may be provided in the order-receiving side apparatus 3, or may be provided in another apparatus on a network other than the ordering side apparatus 2 and the order-receiving side apparatus 3 or on a Cloud. These functions may also be provided in a control unit (not illustrated) of the computer unit 6.

Display Unit

The display unit 7 is constituted using a liquid crystal display or an organic electroluminescence display, for example. A feature thereof is that the display unit may be provided in the ordering side apparatus 2 or in the order-receiving side apparatus 3.

The first selection unit 11 and the second selection unit 12 may be provided in the order-receiving side apparatus 3, or may be provided in another apparatus on a network other than the order-receiving side apparatus 3 and the ordering side apparatus 2, or on a Cloud. Also, the first selection unit 11 may be provided in the ordering side apparatus 2, while the second selection unit 12 is provided in the order-receiving side apparatus 3. Also, the first selection unit 11 and the second selection unit 12 may be integrally constituted. For example, the functions thereof may be provided in a control unit (not illustrated) of the computer unit 6.

With a spectacle lens supply system according to another embodiment of the present disclosure, it is possible to select whether to individually design spectacle lenses to be supplied in correspondence with the RPR of the wearer or whether to employ an existing design. It thus becomes possible to use the RPR of the wearer to select a design with the least changes in the size and shape of the spots formed on the retina, among designs of the shape and size of a plurality of defocus areas prepared in advance.

Note that although the spectacle lens supply system according to another embodiment of the present disclosure is premised on selecting whether takes RPR that depends on the eccentricity angle of the eye of the wearer into consideration in the design of not less than half of the plurality of defocus areas, the technical idea of the present disclosure is also reflected in a spectacle lens supply system that determines to take this RPR into consideration from the beginning. This spectacle lens supply system is, in other words, also a spectacle lens design system that reflects the contents of Spectacle Lens Design Method section.

The technical scope of the present disclosure is not limited to the above embodiments, and also includes modes that have undergone various improvements and modifications in a range that allows the specific effects obtained by the constituent elements of the disclosure and combination thereof to be derived.

REFERENCE SIGNS LIST

1 Spectacle lens supply system
2 Ordering side apparatus
3 Order-receiving side apparatus
4 Communication network
5 Input unit
6 Computer unit
11 First selection unit
12 Second selection unit
13 Order processing unit
14 Storage unit
15 Computation unit

The invention claimed is:

1. A spectacle lens comprising:
a base area that causes a beam that enters through an object-side surface to exit through an eye-side surface and converge on a retina via the eye; and
a plurality of defocus areas that each contact the base area and have a characteristic whereby a beam that passes through at least a portion of the defocus area is incident on the retina as a diverging ray,
wherein, in not less than half of the plurality of defocus areas, at least one of a defocus power and a size of each defocus area is set, so as to compensate for a change in retinal spot size due to relative peripheral refraction (RPR) that depends on an eccentricity angle of the eye of a wearer,
wherein the spot size is obtained based on retina shape data constructed using data on a plurality of the RPR that depend on mutually different eccentricity angles and data on an axial length of the wearer, and
wherein the RPR on the nasal side of the retina at the same eccentricity angle differs from the RPR of the temporal side, and a set pattern of at least one of defocus power and size with respect to each defocus area differs between the plurality of defocus areas disposed on the nasal side of the lens and the plurality of defocus areas disposed on the temporal side of the lens.

2. The spectacle lens according to claim 1,
wherein, in not less than 80% of the plurality of defocus areas, the size of each defocus area is equal, and the defocus power of each defocus area is set so as to compensate for the change in retinal spot size due to the RPR.

3. The spectacle lens according to claim 2,
wherein not less than 80% of the plurality of defocus areas have a cylinder shape that cancels an astigmatism component caused by the RPR that depends on the eccentricity angle corresponding to a position of each defocus area.

4. The spectacle lens according to claim 2,
wherein the spectacle lens is a myopia progression inhibition lens.

5. The spectacle lens according to claim 1,
wherein, in not less than 80% of the plurality of defocus areas, the defocus power of each defocus area is equal, and the size of each defocus area is set so as to compensate for the change in retinal spot size due to the RPR.

6. The spectacle lens according claim 5,
wherein not less than 80% of the plurality of defocus areas have a cylinder shape that cancels an astigmatism component caused by the RPR that depends on the eccentricity angle corresponding to a position of each defocus area.

7. The spectacle lens according to claim 1,
wherein not less than 80% of the plurality of defocus areas have a cylinder shape that cancels an astigmatism component caused by the RPR that depends on the eccentricity angle corresponding to a position of each defocus area.

8. The spectacle lens according to claim 7, wherein, in each cylinder-shaped defocus area, an amount of residual astigmatism after canceling the astigmatic component of the RPR is not more than one third of an actual defocus power of the defocus area after subtracting a spherical equivalent of the RPR that depends on the eccentricity angle corresponding to the position of the defocus area from the defocus power of the defocus area.

9. The spectacle lens according to claim 8, wherein, in not less than 80% of the plurality of defocus areas, the actual defocus power of each defocus area after subtracting the spherical equivalent of the RPR that depends on the eccentricity angle corresponding to the position of the defocus area from the defocus power of the defocus area is in a range of 1.0-4.5 D.

10. The spectacle lens according to claim 1, wherein, in not less than 80% of the plurality of defocus areas, the actual defocus power of each defocus area after subtracting a spherical equivalent of the RPR that depends on the eccentricity angle corresponding to the position of the defocus area from the defocus power of the defocus area is in a range of 1.0-4.5 D.

11. The spectacle lens according to claim 1, wherein the spectacle lens is a myopia progression inhibition lens.

12. The spectacle lens according to claim 1, wherein when the RPR on the nasal side of the retina at the same eccentricity angle is higher than the RPR on the temporal side of the retina, the plurality of defocus areas disposed on the temporal side of the lens have at least one of a higher defocus power and a larger defocus area than the plurality of defocus areas disposed on the nasal side of the lens, and
when the RPR on the nasal side of the retina at the same eccentricity angle is less than the RPR on the temporal side of the retina, the plurality of defocus areas disposed on the nasal side of the lens have at least one of a higher defocus power and a larger defocus area than the plurality of defocus areas disposed on the temporal side of the lens.

13. A design method for a spectacle lens that includes a base area that causes a beam that enters through an object-side surface to exit through an eye-side surface and converge on a retina via the eye and a plurality of defocus areas that each contact the base area and have a characteristic whereby a beam that passes through at least a portion of the defocus area is incident on the retina as a diverging ray, the method comprising:
a setting step of setting, in not less than half of the plurality of defocus areas, at least one of a defocus power and a size of each defocus area, so as to compensate for a change in retinal spot size due to relative peripheral refraction (RPR) that depends on an eccentricity angle of the eye of a wearer,
wherein the spot size is obtained based on retina shape data constructed using data on a plurality of the RPR that depend on mutually different eccentricity angles and data on an axial length of the wearer, and
wherein the RPR on the nasal side of the retina at the same eccentricity angle differs from the RPR of the temporal side, and a set pattern of at least one of defocus power and size with respect to each defocus area differs between the plurality of defocus areas disposed on the nasal side of the lens and the plurality of defocus areas disposed on the temporal side of the lens.

14. The design method for a spectacle lens according to claim 13, further comprising:
a position conversion step of calculating a position on the lens corresponding to an eccentricity angle or calculating an eccentricity angle corresponding to a position on the lens;
wherein the setting step includes setting at least one of the defocus power and the size of each defocus area, so as to compensate for the change in retinal spot size due to the RPR at the eccentricity angle corresponding to the position, and
wherein, in the position conversion step, where an area whose center is a lens optical center and whose radius is one value within a range of 2-6 mm is set as a range covered by rotation, and the eccentricity angle corresponding to a position within the range is set to zero, the eccentricity angle corresponding to a predetermined position on the lens outside the range covered by rotation is an angle formed by the optical axis of the eye and a straight line connecting the predetermined position and an entrance pupil of the eye, after having performed eye rotation such that a line of sight passes through a point on a boundary of the range covered by rotation that is on a straight line formed by the predetermined position and the lens optical center.

15. A design system for a spectacle lens that includes a base area that causes a beam that enters through an object-side surface to exit through an eye-side surface and converge on a retina via the eye and a plurality of defocus areas that each contact the base area and have a characteristic whereby a beam that passes through at least a portion of the defocus area is incident on the retina as a diverging ray, the system comprising:
at least one processor configured to:
select an individual design mode of setting, in not less than half of the plurality of defocus areas, at least one of a defocus power and a size of each defocus area, so as to compensate for a change in retinal spot size due to relative peripheral refraction (RPR) that depends on an eccentricity angle of the eye of a wearer, wherein the spot size is obtained based on retina shape data constructed using data on a plurality of the RPR that depend on mutually different eccentricity angles and data on an axial length of the wearer, or
select an existing design mode of employing one from a plurality of pre-prepared design data that includes the base area and the plurality of defocus areas and whose patterns of the defocus areas are mutually different,
wherein the RPR on the nasal side of the retina at the same eccentricity angle differs from the RPR of the temporal side, and a set pattern of at least one of defocus power and size with respect to each defocus area differs between the plurality of defocus areas disposed on the nasal side of the lens and the plurality of defocus areas disposed on the temporal side of the lens.

16. The design system for a spectacle lens according to claim 15, wherein, the design system is adapted, in the existing design mode, to employ design data with which the change in retinal spot size due to the RPR of the wearer in each defocus area is smallest, from the plurality of design data.

* * * * *